(12) United States Patent
Hanby et al.

(10) Patent No.: US 7,143,051 B1
(45) Date of Patent: Nov. 28, 2006

(54) METHOD AND SYSTEM FOR QUOTING, ISSUING, AND ADMINISTERING INSURANCE POLICIES INCLUDING DETERMINING WHETHER INSURANCE POLICIES ARE SELF BILL OR LIST BILL

(75) Inventors: William W. Hanby, Omaha, NE (US); Sandra K. Callahan, Elkhorn, NE (US)

(73) Assignee: Jefferson Pilot Financial Insurance Company, Omaha, NE (US)

( * ) Notice: Subject to any disclaimer, the term of this patent is extended or adjusted under 35 U.S.C. 154(b) by 0 days.

(21) Appl. No.: 09/577,101

(22) Filed: May 24, 2000

(51) Int. Cl.
*G06Q 40/00* (2006.01)

(52) U.S. Cl. .................. 705/4; 705/2; 705/38

(58) Field of Classification Search ............. 705/2–4
See application file for complete search history.

(56) References Cited

U.S. PATENT DOCUMENTS

| | | | | |
|---|---|---|---|---|
| 4,553,206 A | * | 11/1985 | Smutek et al. ............. 707/101 |
| 4,567,359 A | * | 1/1986 | Lockwood ................. 235/381 |
| 4,766,539 A | | 8/1988 | Fox ........................... 705/4 |
| 4,831,526 A | | 5/1989 | Luchs et al. ............... 705/4 |
| 4,837,693 A | * | 6/1989 | Schotz ....................... 705/4 |
| 4,975,840 A | | 12/1990 | DeTore et al. ............. 705/4 |
| 5,191,522 A | * | 3/1993 | Bosco et al. ............... 705/4 |
| 5,479,344 A | | 12/1995 | Keziah, Jr. ................. 705/4 |
| 5,523,942 A | | 6/1996 | Tyler et al. ................. 705/4 |
| 5,537,315 A | | 7/1996 | Mitcham ................... 705/4 |
| 5,560,005 A | * | 9/1996 | Hoover et al. ............. 707/10 |
| 5,606,496 A | | 2/1997 | D'Agostino ............... 396/235 |
| 5,809,478 A | | 9/1998 | Greco et al. ............... 705/4 |
| 5,845,256 A | * | 12/1998 | Pescitelli et al. .......... 705/4 |
| 5,855,005 A | | 12/1998 | Schuler et al. ............. 705/4 |
| 5,873,066 A | | 2/1999 | Underwood et al. ....... 705/4 |
| 5,884,274 A | | 3/1999 | Walker et al. ............. 705/4 |
| 5,890,129 A | * | 3/1999 | Spurgeon .................. 705/4 |
| 5,903,873 A | * | 5/1999 | Peterson et al. ........... 705/4 |
| 5,913,198 A | * | 6/1999 | Banks ....................... 705/4 |
| 5,930,760 A | | 7/1999 | Anderton et al. .......... 705/4 |
| 5,950,169 A | * | 9/1999 | Borghesi et al. .......... 705/4 |

(Continued)

FOREIGN PATENT DOCUMENTS

WO   WO009120071 A1 * 12/1991

OTHER PUBLICATIONS

BI Directory of Employee benefit information systems, Business Insurance, Mar. 1, 1999, pg. 18. 20/04536966.*

(Continued)

*Primary Examiner*—Joseph Thomas
*Assistant Examiner*—Carolyn Bleck
(74) *Attorney, Agent, or Firm*—Kilpatrick Stockton LLP

(57) ABSTRACT

Described is a method and apparatus for automatically quoting, processing, maintaining, claim processing, billing, and renewing life, health and related coverages for clients, especially group clients—without duplicative data entry. An integrated computer system contains several processing modules. The Quoting Engine module produces quotes, maintains and describes coverages available, rates the insurance, and generates a proposal. The Soldcase module administers sales and commission data and provides information regarding the selected coverage to other modules. An Advanced Relational Database Information System module provides billing and premium processing, and administers the payment of commissions. A Document Generator module produces documents such as policies and certificates. A Claims module performs claim adjudication, claim history, and claim payment. The Renewal module automatically monitors and updates information regarding the client and the insurance to determine if renewed coverage should be sold to the client and, if so, at what price.

21 Claims, 19 Drawing Sheets

U.S. PATENT DOCUMENTS

| | | | | |
|---|---|---|---|---|
| 5,956,691 | A | * | 9/1999 | Powers .......................... 705/4 |
| 6,003,007 | A | * | 12/1999 | DiRienzo ...................... 705/4 |
| 6,076,066 | A | * | 6/2000 | DiRienzo et al. .............. 705/4 |
| 6,108,640 | A | * | 8/2000 | Slotznick .................... 705/26 |
| 6,314,556 | B1 | * | 11/2001 | DeBusk et al. ............. 717/107 |
| 6,343,271 | B1 | * | 1/2002 | Peterson et al. ............... 705/4 |
| 6,526,386 | B1 | * | 2/2003 | Chapman et al. .............. 705/4 |

OTHER PUBLICATIONS

Apex Data Systems, www.apexdatasystems.com*

MII Life Incorporated, Master Group Insurance Application, Mar. 2002.*

ISCS, www.ics.com*

* cited by examiner

METHOD AND SYSTEM FOR QUOTING, ISSUING, AND ADMINISTERING INSURANCE POLICIES INCLUDING DETERMINING WHETHER INSURANCE POLICIES ARE SELF BILL OR LIST BILL

BACKGROUND OF THE INVENTION

1. Field of the Invention

The present invention relates to a method and apparatus for quoting, administering, maintaining, claim processing, and renewing life, health and related coverages for clients, especially group clients. Significantly, the method may be employed so that information regarding any aspect of the insurance transaction need only be entered once, minimizing the risk of error and providing additional security for the information. The method also supports a Management Information System tool for providing timely and accurate information on quotes, sales, claim status, and client administration.

2. Description of the Prior Art

Insurance administration benefits from computerized processing by minimizing the risks of lost and mishandled information as well as reducing the cost of doing business. Because of the multiple combinations of insurance products available, it is very important to prepare accurate proposals and illustrations of insurance products for each prospective client. Computerized processing is of assistance in this area as well.

In most insurance companies, requests for insurance quotes are typically processed on paper through a sales office and then sent to a corporate office for additional processing. The processing of these papers results in time delays, multiple requests for information, and the increased risk of error in collecting or processing information.

Previous processes have been produced to provide proposals in a group insurance setting. These products were inefficient, restrictive and time consuming for the users. Among the problems with previous quoting programs were the lack of comprehensive coverage databases and the inability to transfer information amongst the several departments within the insurance company.

Group insurance products generally have a renewal cycle of one to three years. As a result of this cycle, the need to provide not only temporal information about a group insurance transaction, but also information that spans a time interval, is critical. The paper-based processing of this information is cumbersome and expensive.

SUMMARY OF THE INVENTION

This system uses thin client architecture to improve the speed and accuracy of the entire insurance operation. To overcome the complexity of the calculation in a requested quote and to speed up the operation of presenting a proposal, the processes are divided into server and client processes. Quote information is entered at the client level and complex calculations to generate the quote are performed at the server through a Wide Area Network ("WAN"). This configuration results in the ability to produce on-line quotes using rule based quoting logic and completing the process in seconds. This system also eliminates the need for human interaction beyond the collection of information by the sales representative.

The present invention is a method and apparatus for automatically quoting, processing, maintaining, claim processing, and renewing life, health and related coverages. It comprises an integrated computer system containing several processing modules. The processing module into which data concerning the group is initially entered is the quoting engine ("QE") module. The QE module includes a process for maintaining and describing the coverages available to the group. The QE module also contains processes for rating the insurance and generating a proposal for the client.

Another processing module within the system is a Soldcase module. The soldcase module administers sales and commission data and provides information regarding the selected coverage to other modules within the system.

Another module within the system is an Advanced Relational Database Information System ("ARDIS") module. The ARDIS module processes billing, premium processing, administering of payment of commissions and other general administrative functions.

A Document Generator module is another module within the system, which is employed to produce documents such as policies and certificates in compliance with state and federal laws. A Claims module adjudicates new claims, maintains claim histories, and issues funds to designated recipients.

The final module within the system is the Renewal module. The Renewal module monitors and updates information regarding the client and the insurance to determine if renewed coverage should be sold to the client and, if so, at what price. The introduction of a Renewal module within the general administrative computer system represents a significant improvement over prior art insurance methods. The Renewal module greatly reduces the amount of time necessary to generate a renewal quote and through automation, greatly decreases the number of manually generated renewals.

The described method is capable of providing not only temporal information regarding a transaction, but also information that spans the life of the insurance product through the employment of a relational database to handle large amounts of data over the contract term. This feature of the invention is especially useful in instances where the client is a group. Furthermore, each module within the method fully communicates with each other module. Accordingly, information entered into a module is utilized throughout the transaction within the insurance company. Since information must only be entered once, fewer insurance company representatives need come in contact with the information, providing greater security for the information.

It is, therefore, an object of this invention to provide a method and apparatus for quoting, issuing, claims processing, and administering insurance coverage that minimizes the amount of information that must be gathered by individuals to administer insurance.

It is a further object of this invention to provide a method and apparatus for quoting, issuing, claims processing, and administering insurance coverage that minimizes the duplication of manually entered information.

It is yet another object of this invention to provide a method and apparatus for quoting, issuing, claims processing, and administering insurance coverage that monitors client information over the life of the coverage and automatically produces information pertaining to the renewal of the policy.

It is a further object of the invention to provide a method and apparatus for quoting, issuing, claims processing, and administering insurance coverage that improves the speed and accuracy of the insurance operation and increases the overall quality of the products purchased by the insurance consumer.

It is another object of this invention to provide a method and apparatus for quoting, issuing, claims processing, and administering insurance coverage that minimizes the number of employees that have access to client information, increasing the level of security for that information.

These and other objects of the invention will be apparent to those skilled in the art.

DESCRIPTION OF THE PREFERRED EMBODIMENT

Figure 1:
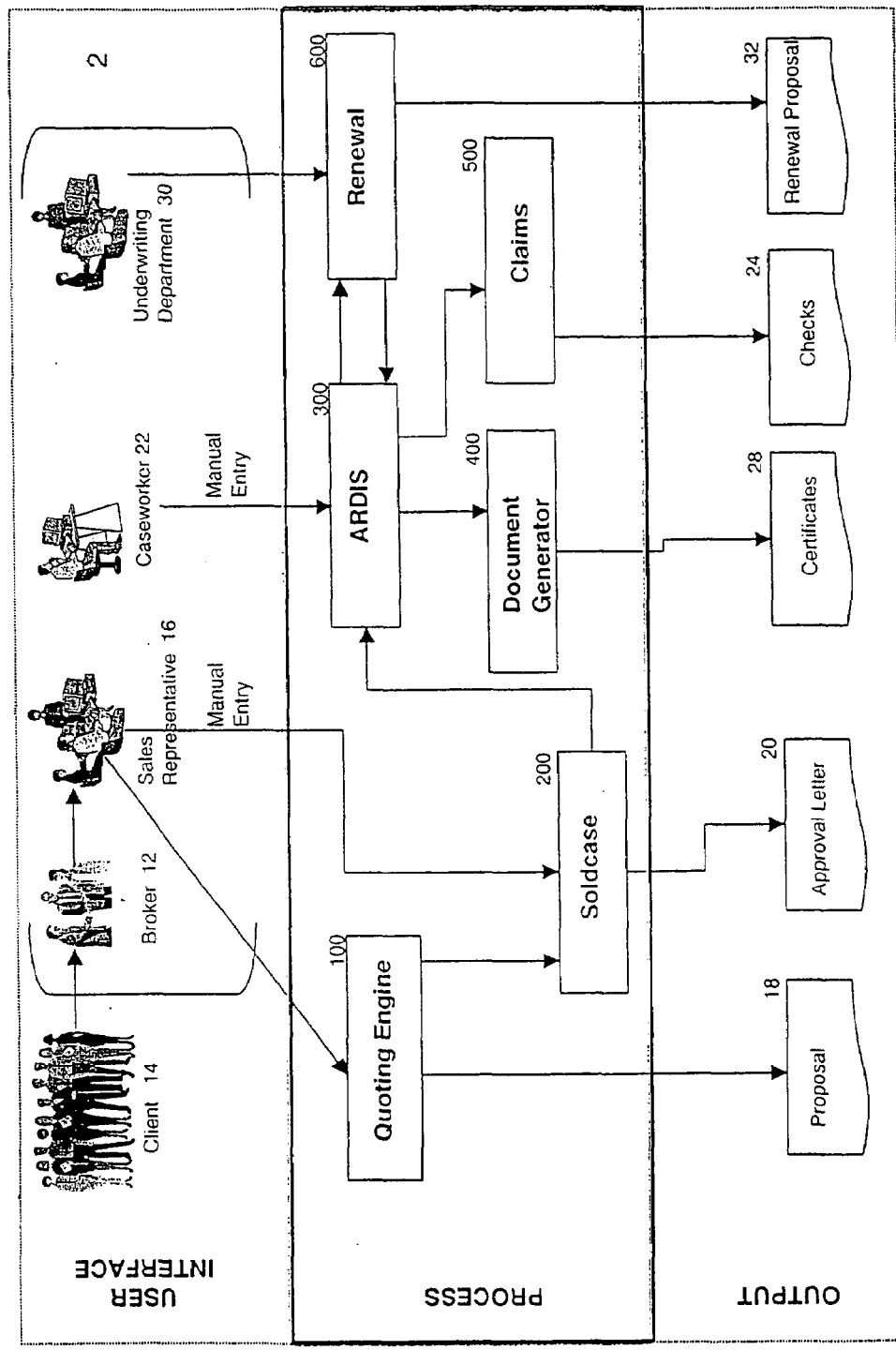
FIG. 1 is a diagram that shows the flow of information through the claimed method and the output generated thereby.

The flow of information through the method of quoting, issuing, claims processing, and administering insurance coverage 10 of the present invention is shown in FIG. 1. It indicates that between the collection of data and the creation of documents representing the transaction, data is processed in some combination of six different modules; a Quoting Engine ("QE") module 100, a Soldcase module 200, an Advanced Relational Database Information System ("ARDIS") module 300, a Document Generator module 400, a Claims module 500, and a Renewal module 600. The names given the modules and the accompanying steps performed by the modules are not intended to be rigidly applied, but are intended only to provide an example of the claimed method. Variations on the organization of the method 10 are anticipated and intended to be claimed herein.

The method 10 is to be employed by an insurance company 2, also referred to as the user. As shown in FIG. 1, the broker 12 contacts the prospective client 14, usually a group, to obtain relevant information. Although the method 10 may be employed for individual insurance administration, it is described generally herein as a method for administering group insurance. Once the necessary information is entered into the QE module 100, the QE module 100 then generates the premium rate and an appropriate proposal 18 is sent to the prospective client 14.

Once the client 14 accepts the proposal 18, the sales representative 16, who may be any employee of the insurance company 2, enters additional information about the transaction, such as commission, producer and binder amount information, into the Soldcase module 200. The Soldcase module 200 retrieves all the relevant information from the QE module 100 along with additional information provided by the sales representative 16 to generate a sales entry and assigns a policy number to the transaction. This policy number is subsequently transferred to the ARDIS module 300, which includes a database. The Soldcase module 200 also generates the approval letter 20, if the client 14 has requested a letter. The Soldcase module 200 then transfers client information, coverage information, sold rate, sold premium and binder amount in addition to the policy information to the ARDIS module 300.

Once the product has been sold to the client 14, the ARDIS module 300 then retrieves the relevant information and creates necessary entries into the database to administer the client's account. The ARDIS module 300 is used to maintain the information throughout the life of the product and to provide certificate, commission, premium and member information to the Document Generator module 400, lockbox, account department and various subsystems, respectively. The Document Generator module 400 retrieves all of the necessary information from the ARDIS module 300 databases, generates contracts and certificates 28, and maintains an electronic copy of those documents.

The Claim module 500 receives information from the ARDIS module 300 once the case is issued. The information is passed from the ARDIS tables to the various claim tables through a middleware interface that synchronizes the data. The Claims module 500 adjudicates new claims, maintains claim histories, and issues funds to designated recipients The Renewal module 600 retrieves the policy data from the ARDIS module 300 databases for a client 14 whose policy is scheduled to expire in the near future. This information is sent to the renewal underwriting department 30 for further renewal processing and, at the same time, may create a renewal letter (not shown) for the client 14. Based on the information collected by the underwriting department 30, the QE module 100 generates the renewal premium rate, which is then fed back to the Renewal module 600 and ARDIS module 300 databases. The Renewal module 600 retrieves the necessary information from the ARDIS module 300 and QE module 100 databases to provide the renewal proposal 32. This information could include revised census details used to generate the revised renewal rate. Once the client 14 renews the product, the renewal module 600 updates the necessary information in the ARDIS module 300 database for continued administration, including updated premium billing rates and commission adjustments. The Renewal module 600 also generates the renewal letter (not shown) that is sent to the client 14; the Document Generator module 400 again will maintain the electronic copy of the renewed contract.

The flow of information through the method 10 is shown in more detail in FIGS. 2–12. The initial steps in the method 10 include the processing of information in the QE module 100. Among the steps taken in the QE module 100 are the Request For Quote ("RFQ") process 102, the coverage maintenance process 130, the rating process 150 and the proposal process 179. The initial information may be gathered in any form, such as paper, e-mail, facsimile or other medium as requested by the client 14.

Figure 2A:
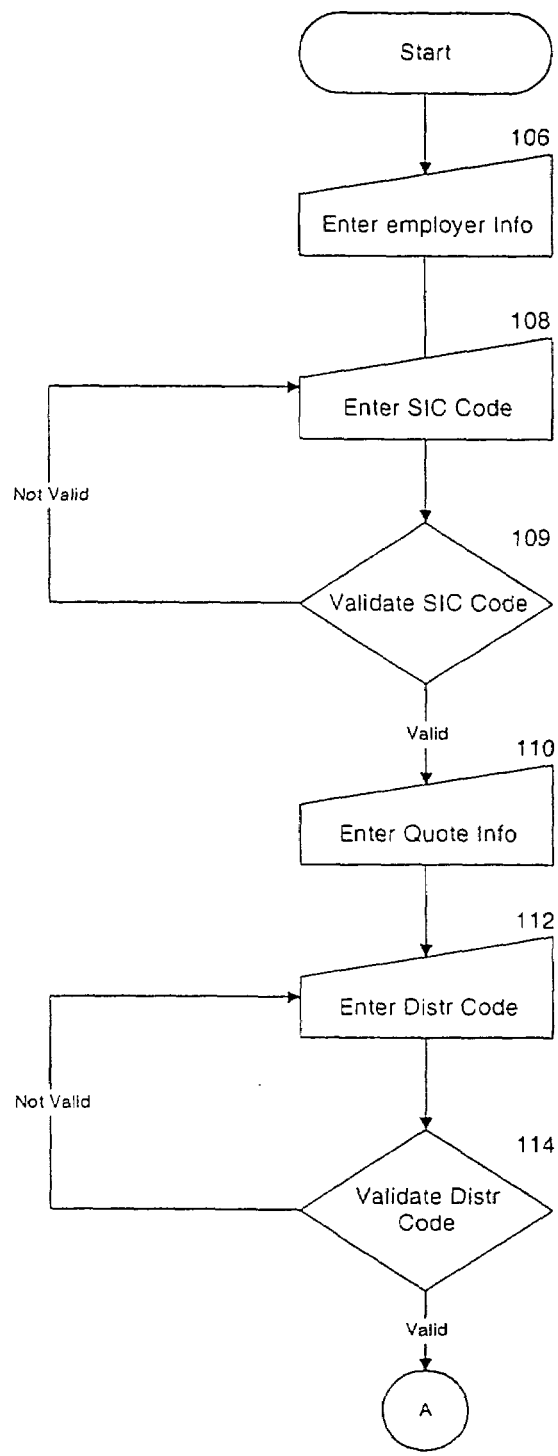
FIGS. 2A and 2B represent a flowchart of the Request for Quote process within the Quoting Engine ("QE") module.
Figure 2B:
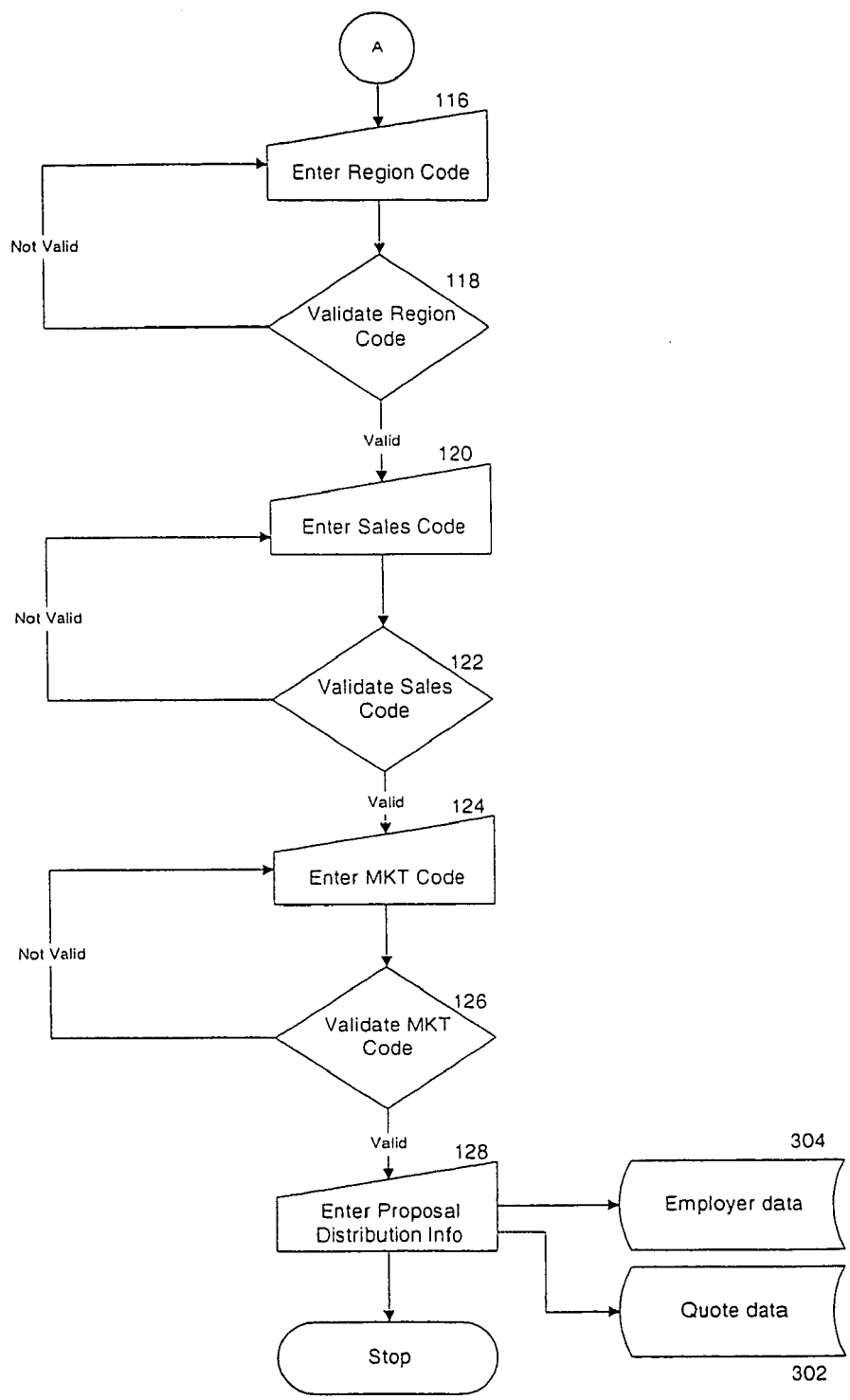

FIGS. 2A and 2B depict the steps required by the RFQ process 102 within the QE module 100. This portion of the QE module 100 accepts employer information 106, including employer identification and industry information, from the client 14 or sales representative 16 and validates the employer information 106. If the employer identification in the employer information 106 duplicates employer identification in an employer database 304, then the RFQ process 102 displays a message asking the user to assign a different employer identification. After validating the employer information 106, the RFQ process 102 of the QE module 100 accepts the Standard Industrial Classification code ("SIC code") 108, which is then validated in step 109 against a SIC database 306. If the SIC code 108 is not available in the SIC database 306, then it asks the user to enter a valid SIC code 108 for the employer's industry.

Throughout this description of the method 10, reference is made to several databases. In practice, each database may be a section of a larger database and information stored in a general database may be stored in an individual accessible database.

After validating the SIC code 108, the RFQ process 102 accepts the quote information 110 and stores it in a general database 310 (not shown) of the ARDIS module 300. The quote information 110 includes group information, group industry code, quote-effective date, estimated proposed lives, prior carrier, and other standard industry information. The RFQ process 102 then accepts distributor information 112. In step 114, the RFQ process 102 validates distributor information 112 with the distributor database 308 and retrieves information regarding the region information 116, sales information 120 and marketing information 124 from the general database 310 or the sales representative 16. The information is validated in steps 118, 122 and 126, and the information regarding the parties to whom the proposal is to be distributed is entered in step 128. The QE module 100 stores the entered information (i.e. the entered information regarding the parties to whom the proposal is to be distributed) into the quote database 302 and the employer database 304.

Figure 3A:
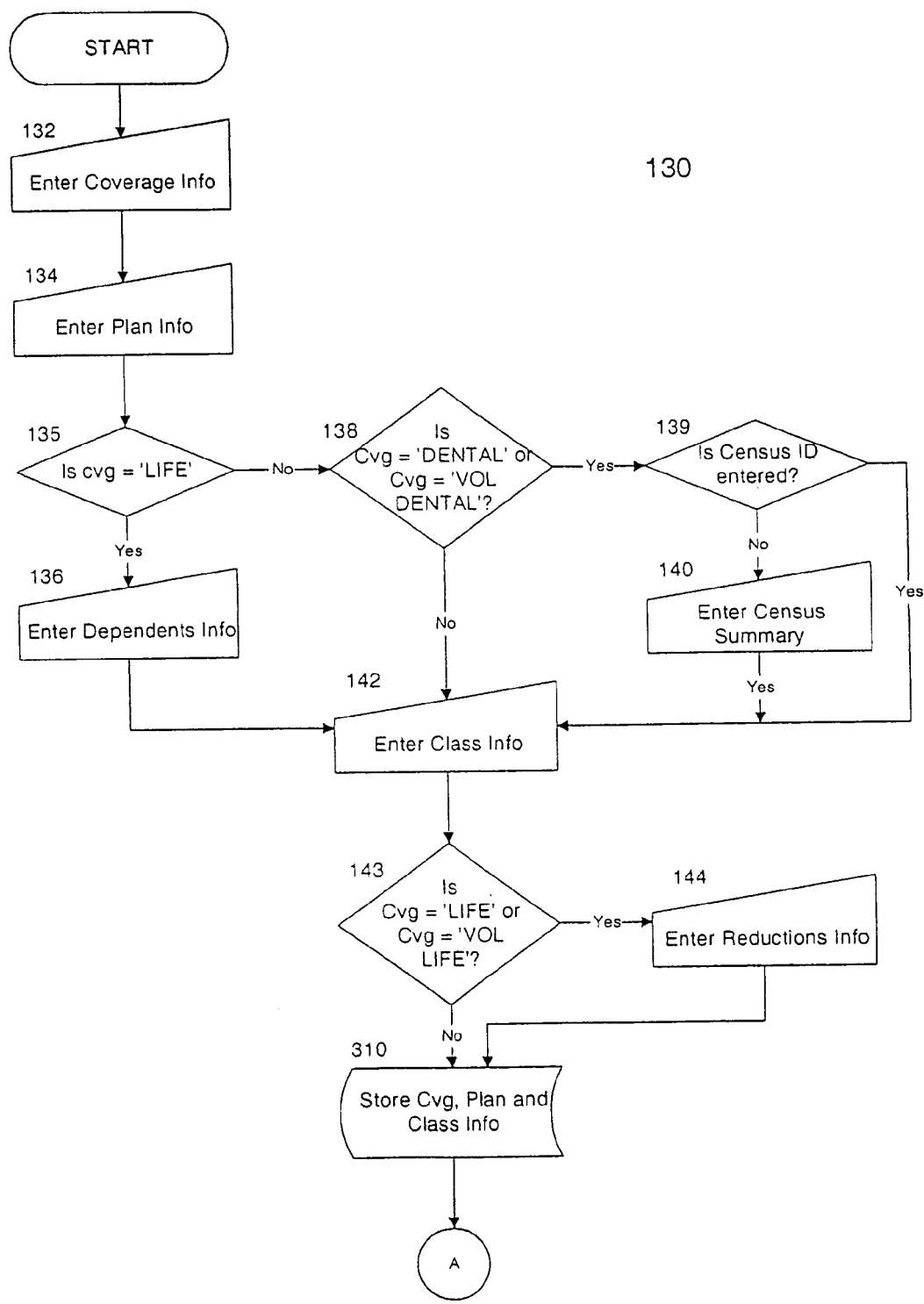
FIGS. 3A and 3B are a flowchart of the coverage process within the QE module.
Figure 3B:
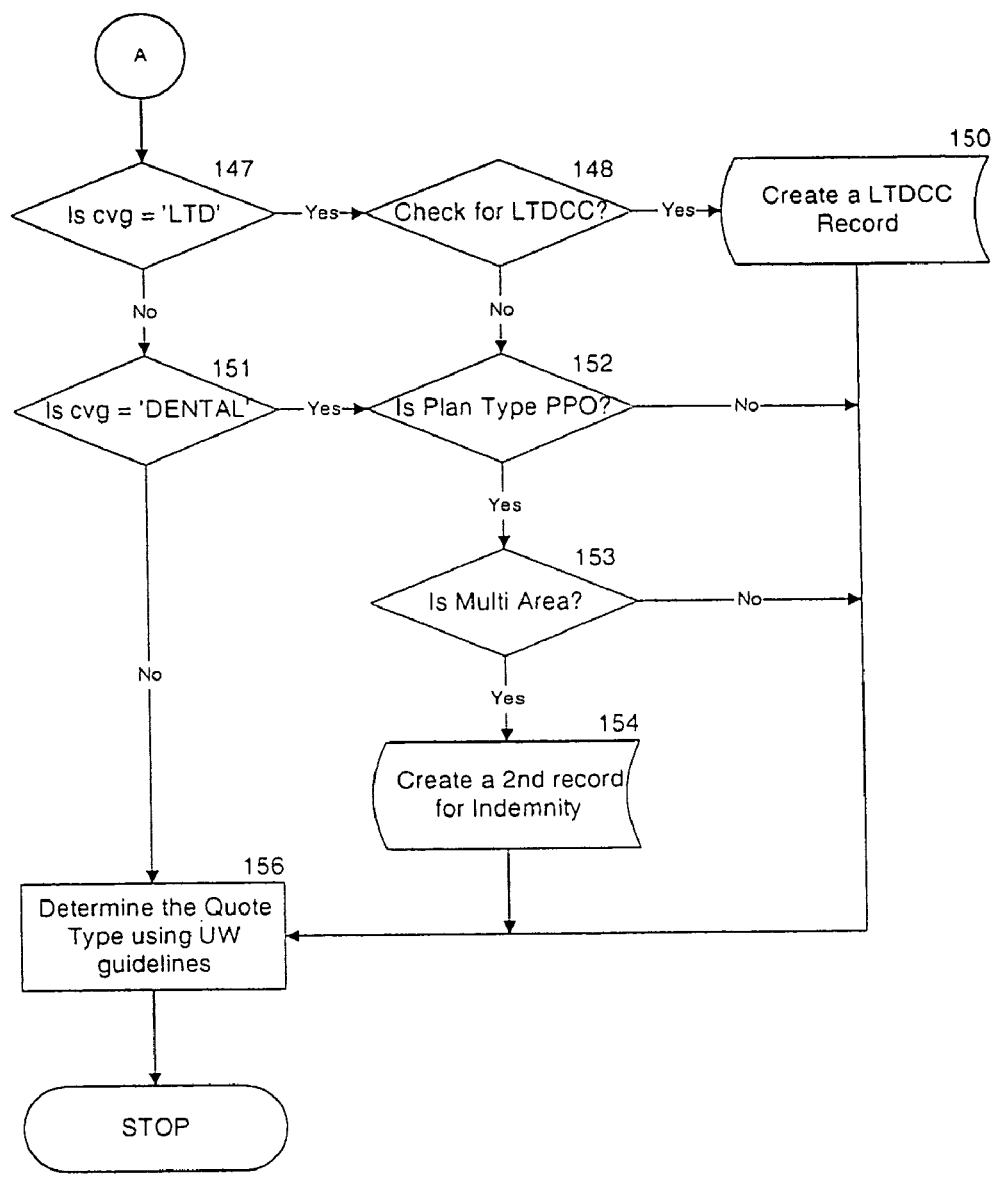

FIGS. 3A and 3B illustrate the detail data flow of an example of the coverage maintenance process 130 for the QE module 100. The method 10 may be used for a variety of different coverages, and the examples given are not intended to show the scope of the utility of the method 10, but are only exemplary. The coverage maintenance process 130 accepts coverage information 132 and plan information 134 from the sales representative 16 and prompts the user determines if the entered coverage is 'LIFE'; if so, the program logic then allows the user to enter the dependents information 136. The coverage maintenance process 130 determines if the entered coverage is 'DENTAL' or 'Voluntary DENTAL' in step 138; and, if so, in step 139, it then checks whether the census has been entered. If the census has not been entered, the process 130 allows the user to enter the census summary 140. Once the plan information 134 has been entered, then it allows the user to enter class information 142. For 'LIFE' and 'Voluntary LIFE' coverages, as determined in step 143, the coverage maintenance process 130 allows the user to alter coverage amounts 144. Once the coverage information 132, plan information 134 and class information 142 have been entered and validated, the coverage maintenance process 130 stores all the data in the coverage, rating and benefit tables of the general database 310.

If the entered coverage is Long Term Disability ("LTD") as determined in step 147, the coverage maintenance process 130 checks whether there is an associated record needed for Long Term Disability Cost Containment ("LTDCC") or not depending on the entered values in step 148. If such a record is needed, the coverage maintenance process 130 automatically creates the record 150. If the entered coverage is 'DENTAL' as determined in step 151, the coverage maintenance process 130 then checks for the plan type in step 152. If the plan type is PPO and is quoted for multi-area as determined in step 153, then a second record for the indemnity option 154 is automatically created. This information is then validated.

After validation is complete, the coverage maintenance process 130 checks the underwriting guidelines and determines the quote type for the information that has been entered in step 156. Typical types of quotes might be "Super Express" (SE), Custom (CU) or Decline (DE). The SE and DE quote types are completely automated within the system, automatically generating in seconds a proposal 18 or a letter declining coverage (not shown), respectively. If the quote type is determined to be CU, the information is further analyzed to determine whether a proposal 18 or letter declining coverage will be sent to the client 14. Among the considerations employed in determining the quote type are custom business rules and other information supplied by the underwriting department 30, actuarial department (not shown) and compliance department (not shown).

Figure 4:
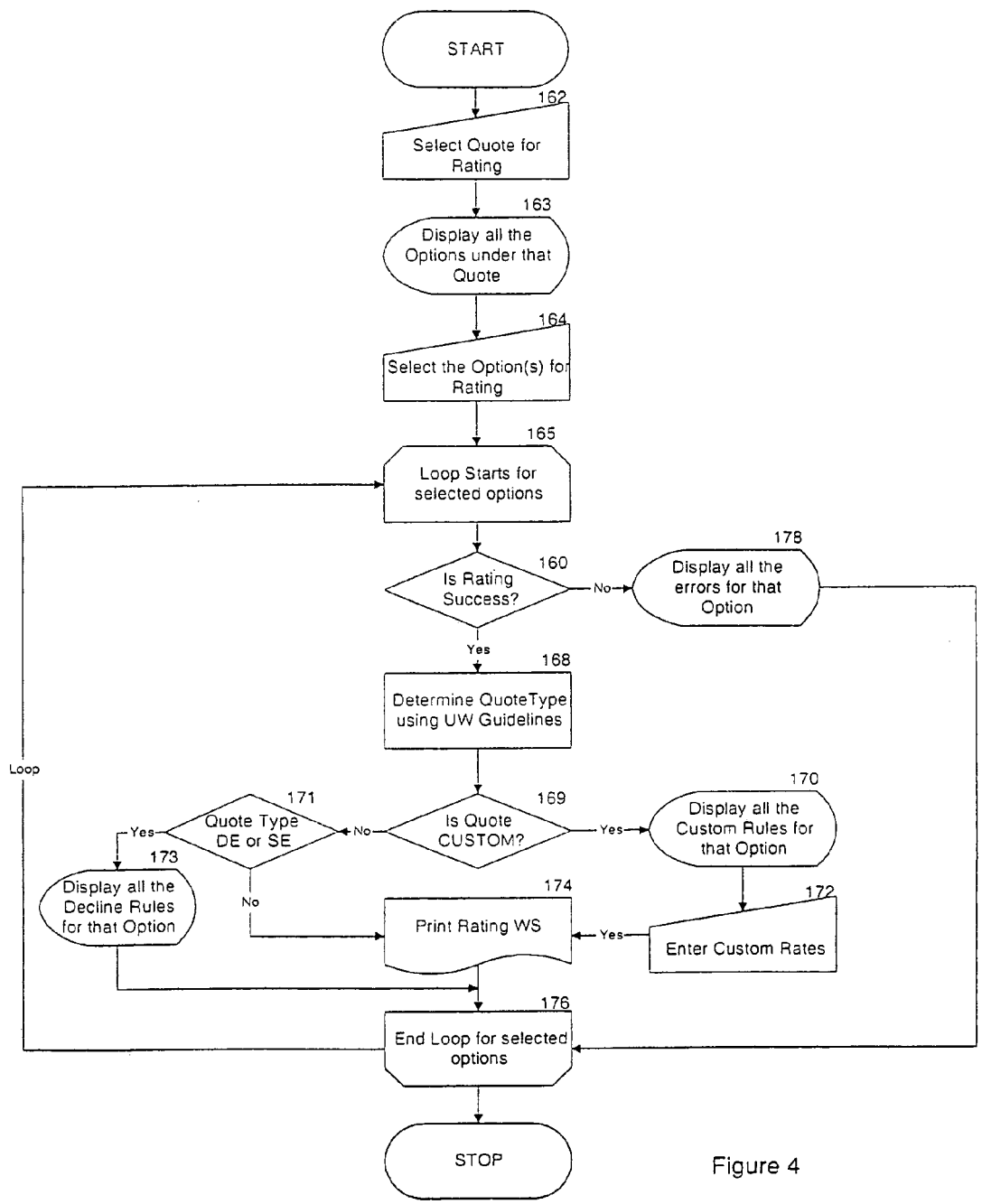
FIG. 4 is a flowchart of the rating calculation process within the QE module.

FIG. 4 is a flowchart of the rating process 160 within the QE module 100. Once the user selects a quote sequence 162, the rating process 160 displays all the non-rated options under that quote in step 163. It allows the user to select multiple options 164 at the same time. It loops through all the selected options beginning with step 165. If the rating is successful as determined in step 166, then it determines the quote type for that option in step 168. If the quote type changes to CU, as determined in step 169, all the rules for that quote type are displayed in step 170. The process 160 allows the underwriting department 30 to change some of the values and recalculates the quoted rates. After calculating and entering the premium rates in step 172, the rating process 160 allows the user to print the rating worksheet 174, ending the loop for that option in step 176. If, for some reason, the calculation fails, then it displays a message in step 178 so the sales representative 16 or other insurance company representative can change the information accordingly and re-rate the option. Once the option has been rated, the process 10 does not allow any changes to the quoted information.

Figure 5:
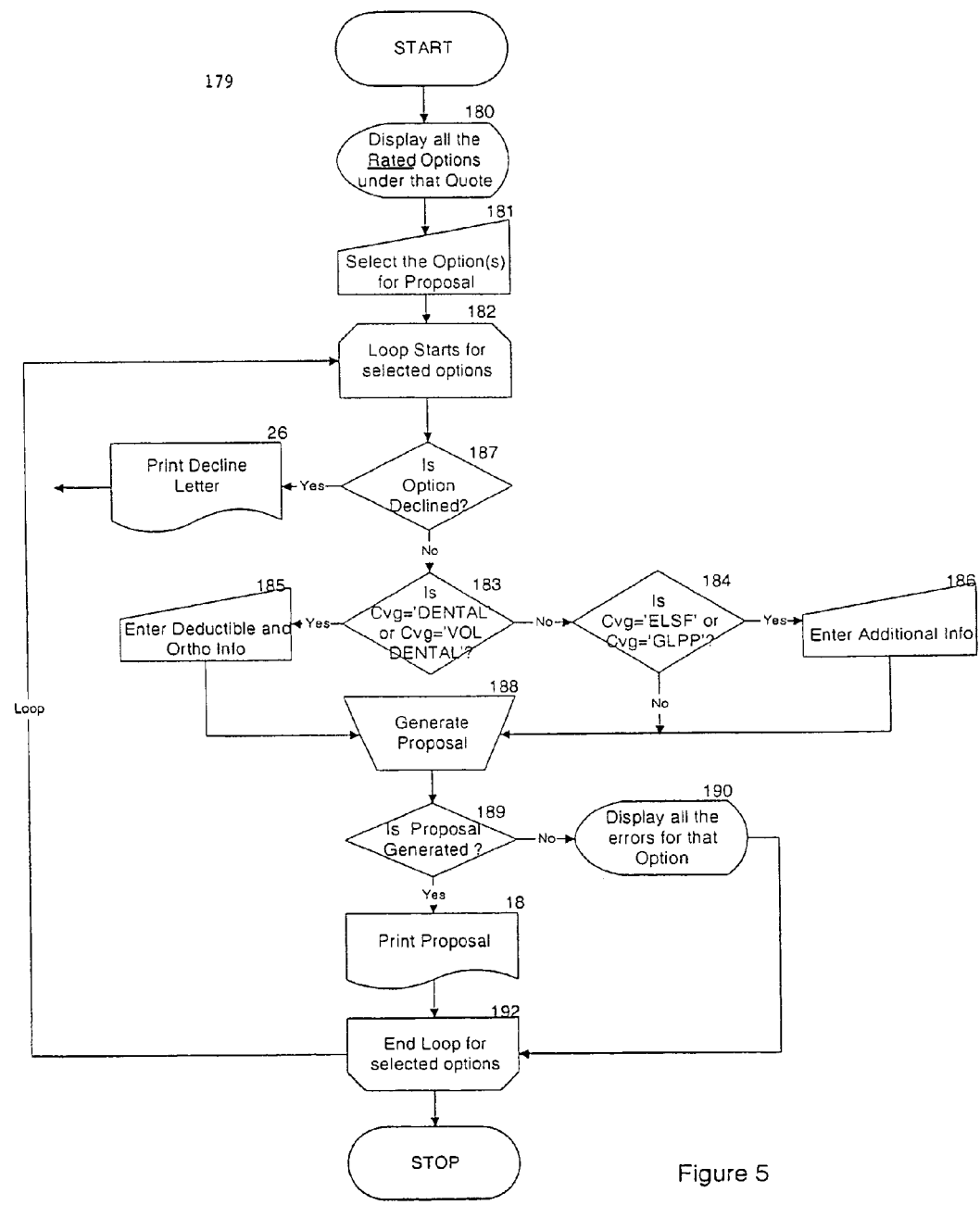
FIG. 5 is a flowchart of the proposal process within the QE module.

FIG. 5 is a flowchart of the proposal process 179 within the QE module 100. Once a user selects a quote sequence 162, the proposal process 179 displays all the rated options as well as the decline options under that quote in step 180. It allows the user to select multiple options at the same time in step 181 and loops through each option starting in step 182. If the proposal process 179 declines an option in step 187, a letter 26 notifying the client 14 of the denial is generated. The proposal process 179 determines the type of coverage, eg. DENTAL, in steps 183 and 184 and asks for additional information for those coverages in steps 185 and 186. If an appropriate proposal 18 is generated in step 188 and validated in step 189, then the proposal 18 is transmitted to the broker 12 and the client 14 by mail, fax, e-mail, or other medium. As with all input information, all output of the method 10 may be in any form as requested by the client 14. If, for some reason, the proposal process 179 does not generate a proposal 18, then it displays a proper message in step 190 so the sales representative 16 can change the information accordingly and re-generate the proposal 18.

Following the generation of the proposal 18 or display of the message 190, the loop ends in step 192.

Figure 6A:
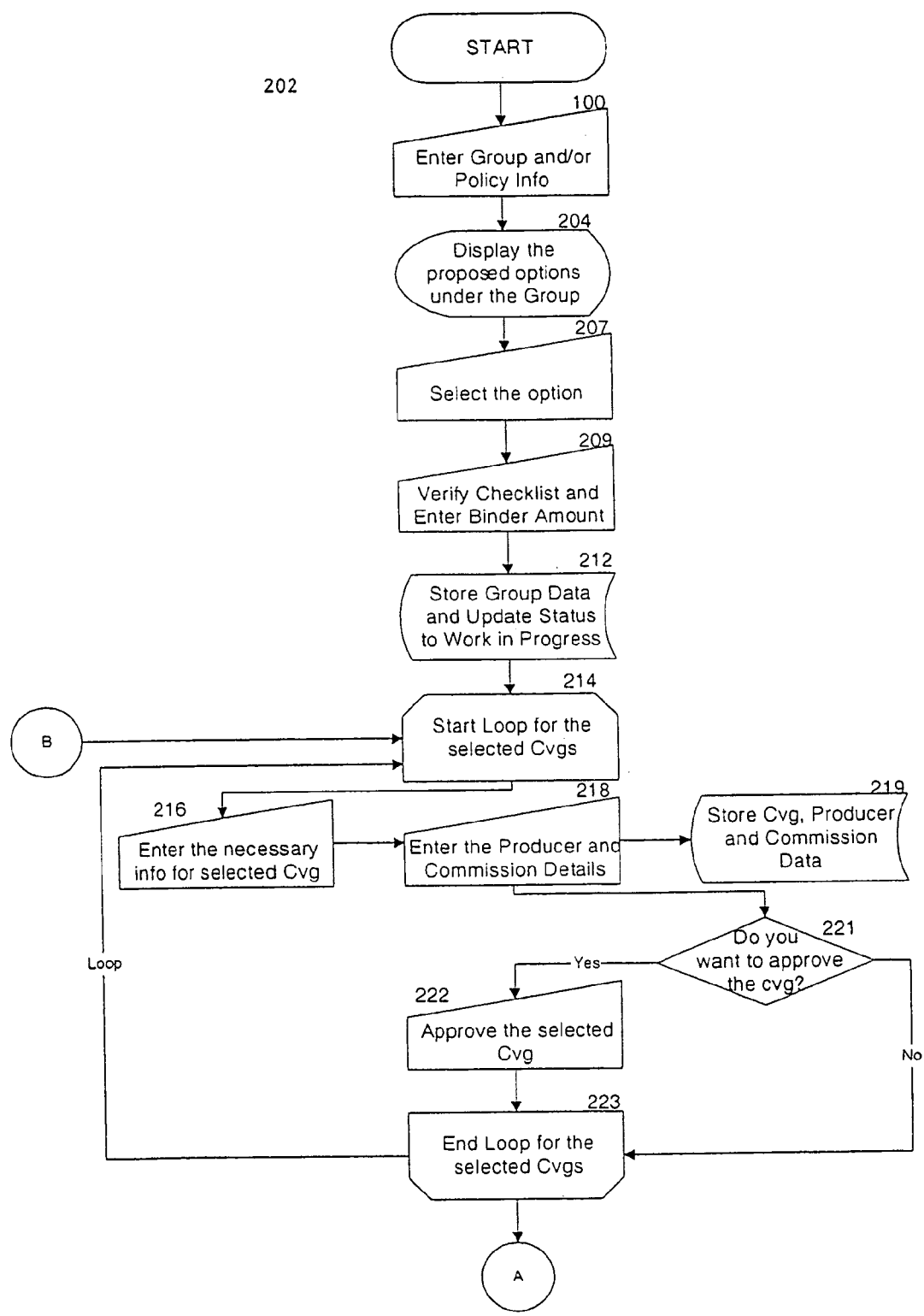
FIGS. 6A and 6B are a flowchart of the Soldcase process within the Soldcase module.
Figure 6B:
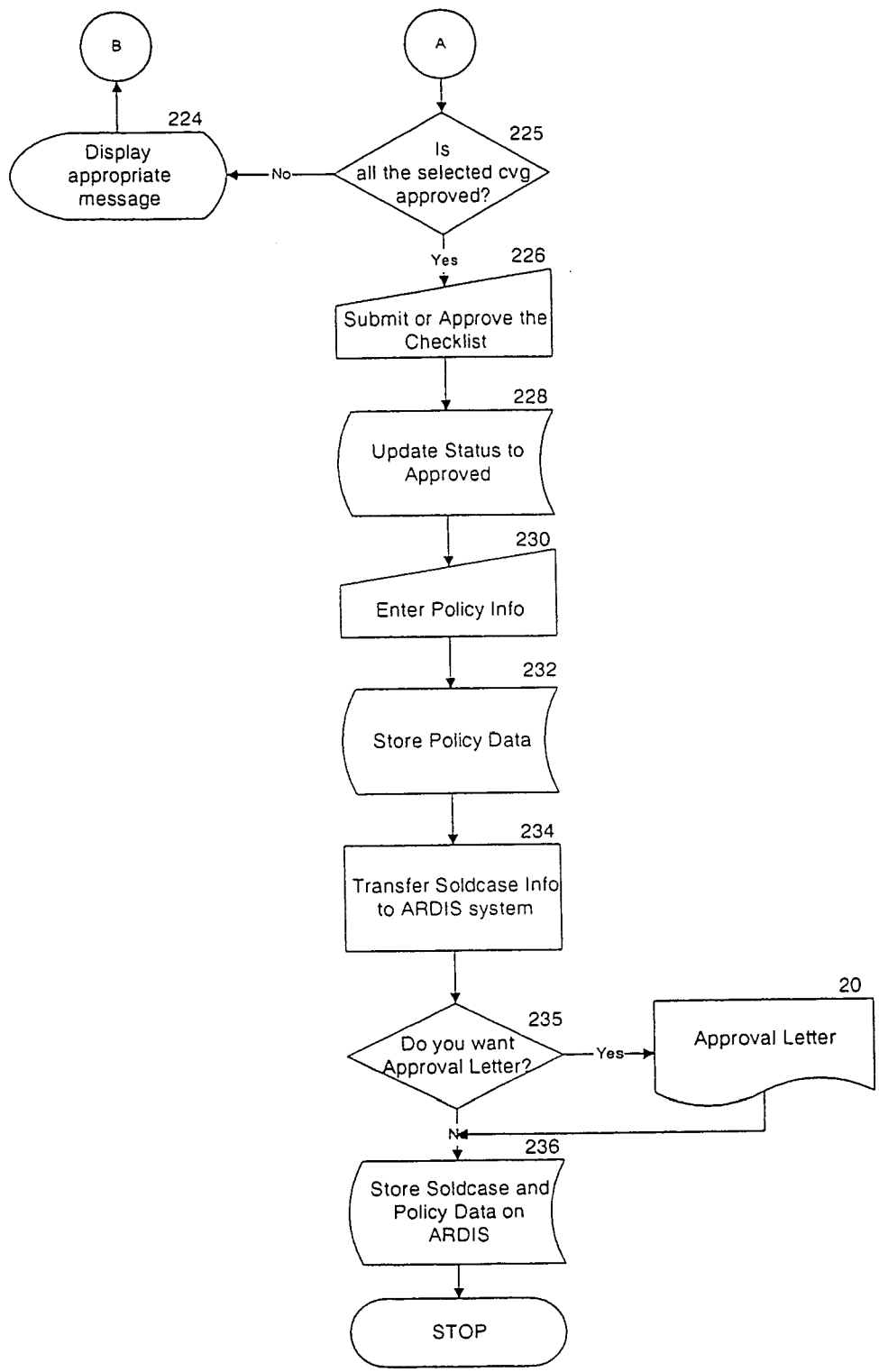

FIGS. 6A and 6B are a flowchart of the Soldcase module process 202. Once a user selects employer information 106, the soldcase process 202 displays all the proposed options for that client 14 in step 204. The user then selects the appropriate option in step 207 and verifies the checklist in step 209. Once the information is validated, the soldcase process 202 stores all the data in the appropriate database tables and updates the soldcase status to 'work in progress' at step 212.

The process 202 then loops through all the coverages associated with the selected option beginning at step 214. It may ask for additional information for each of the coverages in step 216. It may also ask for the commission and producer details in step 218, storing this information during step 219 into the appropriate database tables in the general database 310. After validating the data, the soldcase process 202 checks whether the user wants to approve the coverage in step 221 allowing the user to approve the coverage in step 222, ending the loop at step 223. If the coverages are not approved as determined in step 225, the system displays an appropriate message at step 224. If all the coverages are approved for that group, the process 202 allows the user to submit or approve the checklist at step 226 and updates the status of the policy to 'approved' in step 228. After approval, the user can enter the policy information 230, store the policy data in step 232, and transfer this information to the ARDIS module 300 in step 234. The soldcase process 202 also determines whether an approval letter has been requested in step 235 and generates the approval letter 20, if it has been requested. The policy data is then stored in the general database tables 310 in the ARDIS module 300 in step 236.

Figure 7:
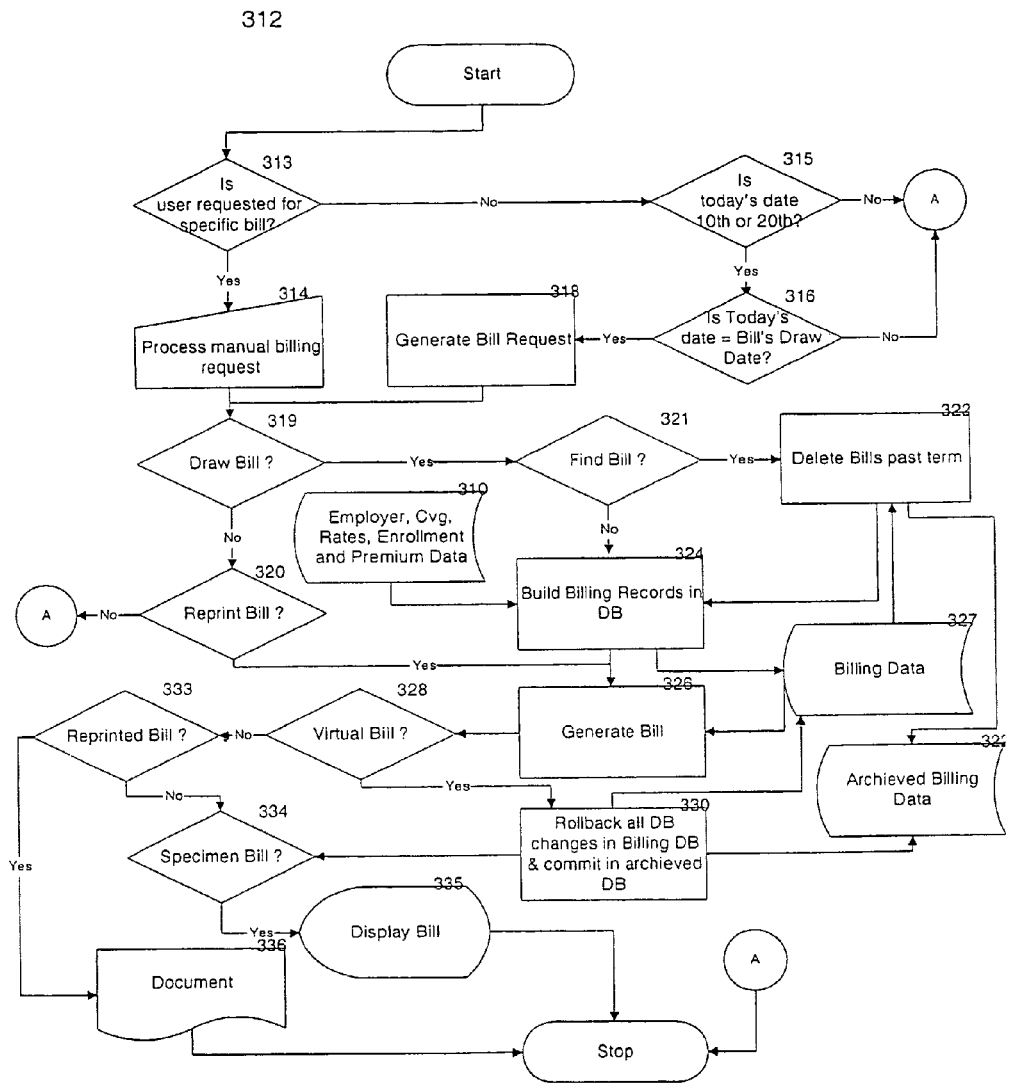
FIG. 7 is a flowchart of the billing process within the ARDIS module.

FIG. 7 is a flowchart of the billing process 312 within the ARDIS module 300. The billing process 312 supports manual as well as automatic billing. A user can request a specific bill at step 313 and provide a manual billing request 314; otherwise, automatic billing is designed to occur on all the bills that are due based on their billing periods such as on the 10$^{th}$ or 20$^{th}$ day of the month as determined in steps 315 and 316. The automatic billing generates a bill request in step 318 that is similar to the manual billing request entered in step 314.

The billing process 312 determines whether the request is to draw the bill 319 or to reprint the bill in step 320. If the request is to draw a bill, the billing process 312 in step 321 seeks the bill in the billing table of the general database 310. If it finds a bill, the past term bill is deleted from the billing table in step 322 and a new billing record is created in the billing table in step 324 to replace the existing past term bill. If no past term bill exists, the billing process 312 creates a new record in the billing table in step 324. It uses employer information, coverage information, rate information, enrollment information and premium information from the general database 310 to generate a billing record. After creating the record in the table, it generates a bill in step 326 by accessing the billing data 327. If the bill is a virtual bill as determined in step 328, the billing process 312 rolls back all the database changes in step 330 and stores the billing information in the archived database in step 332. If the request is made to reprint the bill in step 333, then it generates a bill 336 based on current bill information. If the request is made for a specimen bill in step 334, the process only displays the bill on the screen in step 335.

Figure 8:
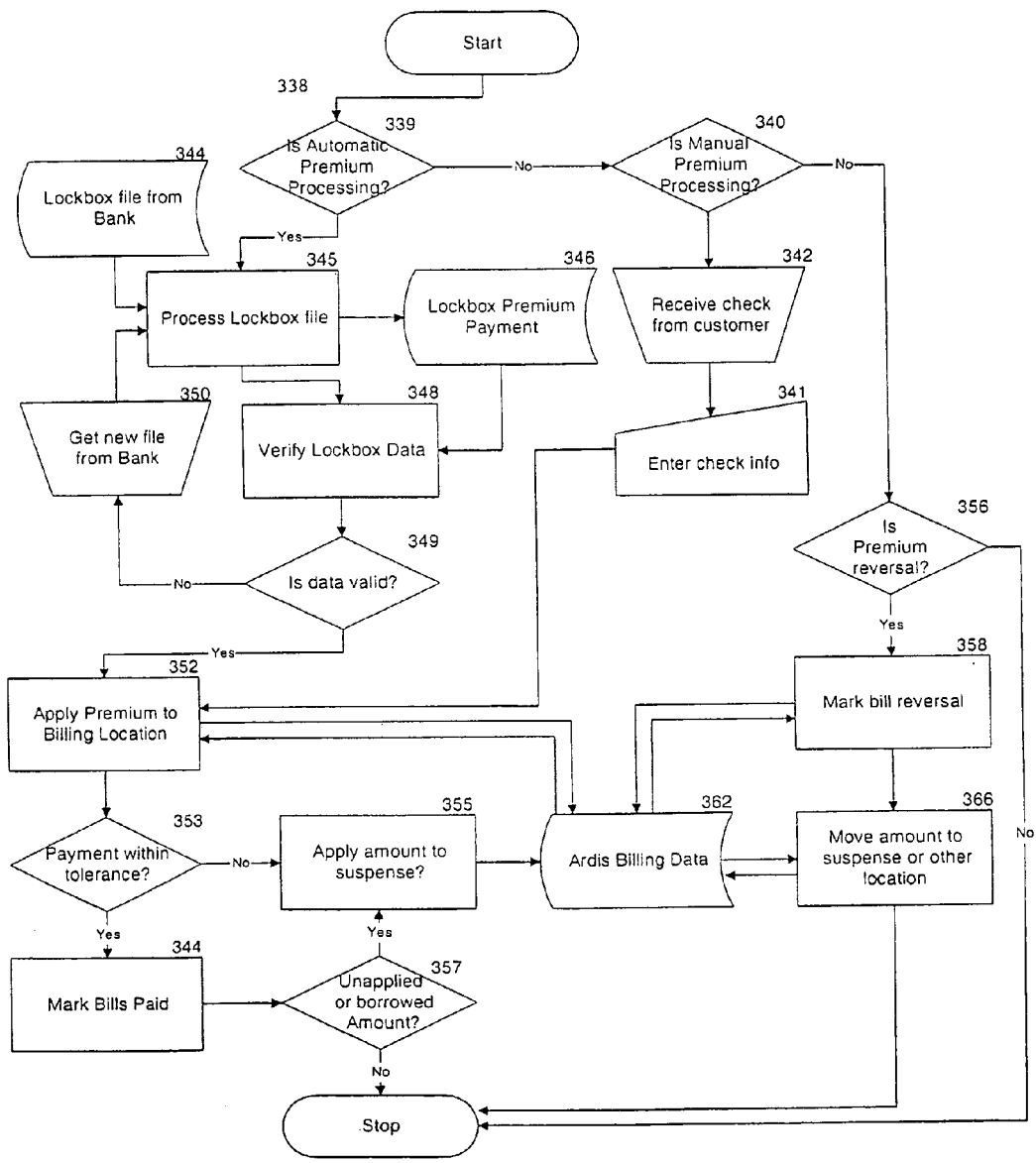
FIG. 8 is a flowchart of the premium process within the ARDIS module.

FIG. 8 is a flowchart of the premium process 338 within the ARDIS module 300. This process supports manual premium processing as well as automatic premium processing and determines which method is to be applied in steps 339 and 340. In manual processing, a user can enter the payment manually in step 341 when the payment is received from the customer at 342. In the automatic process, the ARDIS module 300 receives premium data 344 from the bank via an electronic media in step 345. Once the payment has been received in step 346, the process verifies and validates the data that was received in steps 348 and 349. If the received data is not valid, the user contacts the bank and asks for the new data in step 350.

After completing the initial steps of manual or automatic premium processing, the process 338 then applies all the premium data to the billing location in step 352. If the payment received is within the tolerance limit as determined in step 353—i.e. the difference of bill due amount and the payment received—the premium process 338 marks the corresponding bill as paid in step 354. Otherwise, the payment is applied to the suspense account in step 355. If the payment received is more than the bill amount, as determined in step 357, the difference is added to the suspense account in step 355. The process 338 also handles the reversal of premium. In the case where a reversal is required as determined in step 356, the process 338 marks the bill as a reversal in step 358 and moves the premium amount to the suspense account or another billing location in step 360 depending on the situation. In each instance, data from the premium process 338 is transferred to the general database 310 in the ARDIS module 300 in step 362.

Figure 9A:
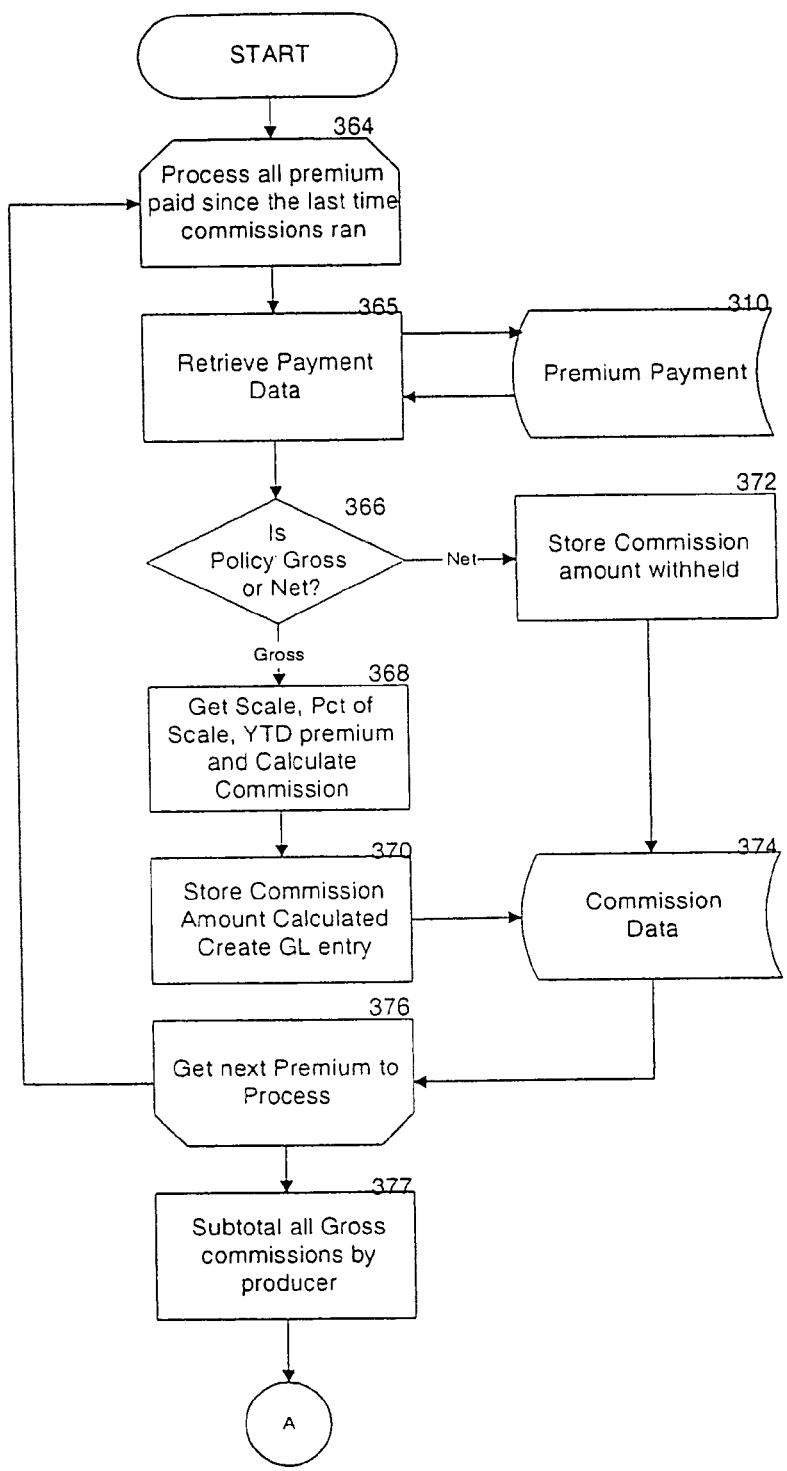
FIGS. 9A and 9B are a flowchart of the commission process within the ARDIS module.
Figure 9B:
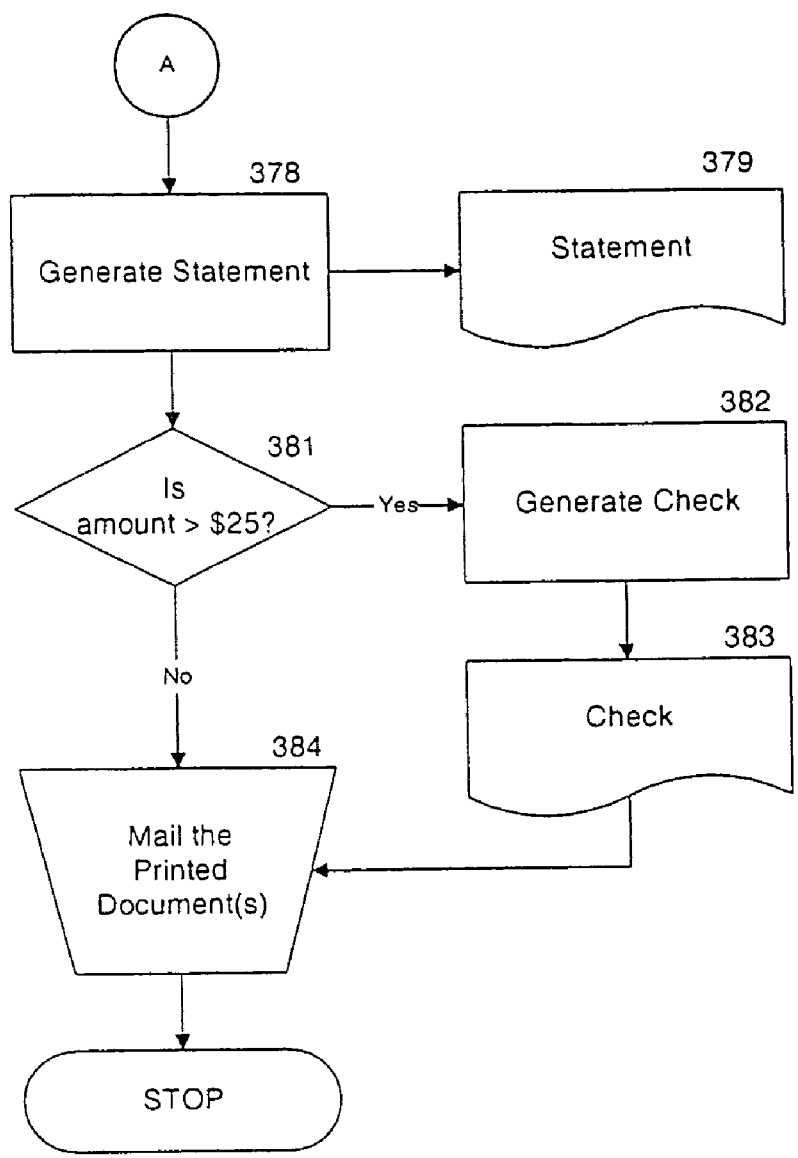

FIGS. 9A and 9B are a flowchart of the commission process 363 within the ARDIS module 300. The commission process 363 is preferably executed periodically in a batch process and keeps track of each batch cycle. It picks all the paid premiums for which the commissions have not been accounted during previous batch cycles in step 364. In step 365, the commission process 363 retrieves the payment data from the premium payment table in the general database 310 and determines whether the premiums on the policy are submitted gross or net of commissions in step 366. If the policy is gross, then the commission process 363 retrieves scale, percentage of the scale and year-to-date premium information from the general database 310 in step 368. The commission process 363 also calculates the commission based on the information retrieved in step 368. It stores the calculated commission in the commission table and creates an entry into the general ledger in step 370. For the net policy, the process 363 stores in the commission table in step 372 the commission amount withheld by the producer. In each case, the commission data is stored in step 374. These steps are repeated for each unaccounted policy with the final step of the loop being step 376.

The commission process 363 then calculates the gross commission for each producer in step 377 and prepares the commission statement 378 which is printed in step 379. The process 363 also creates and prints the commission check for the producer in steps 382 and 383 if the commission amount is greater than a predefined amount as determined in step 381. Once the statements and/or checks have been generated, the printed output is mailed to the appropriate recipients in step 384.

Figure 10:
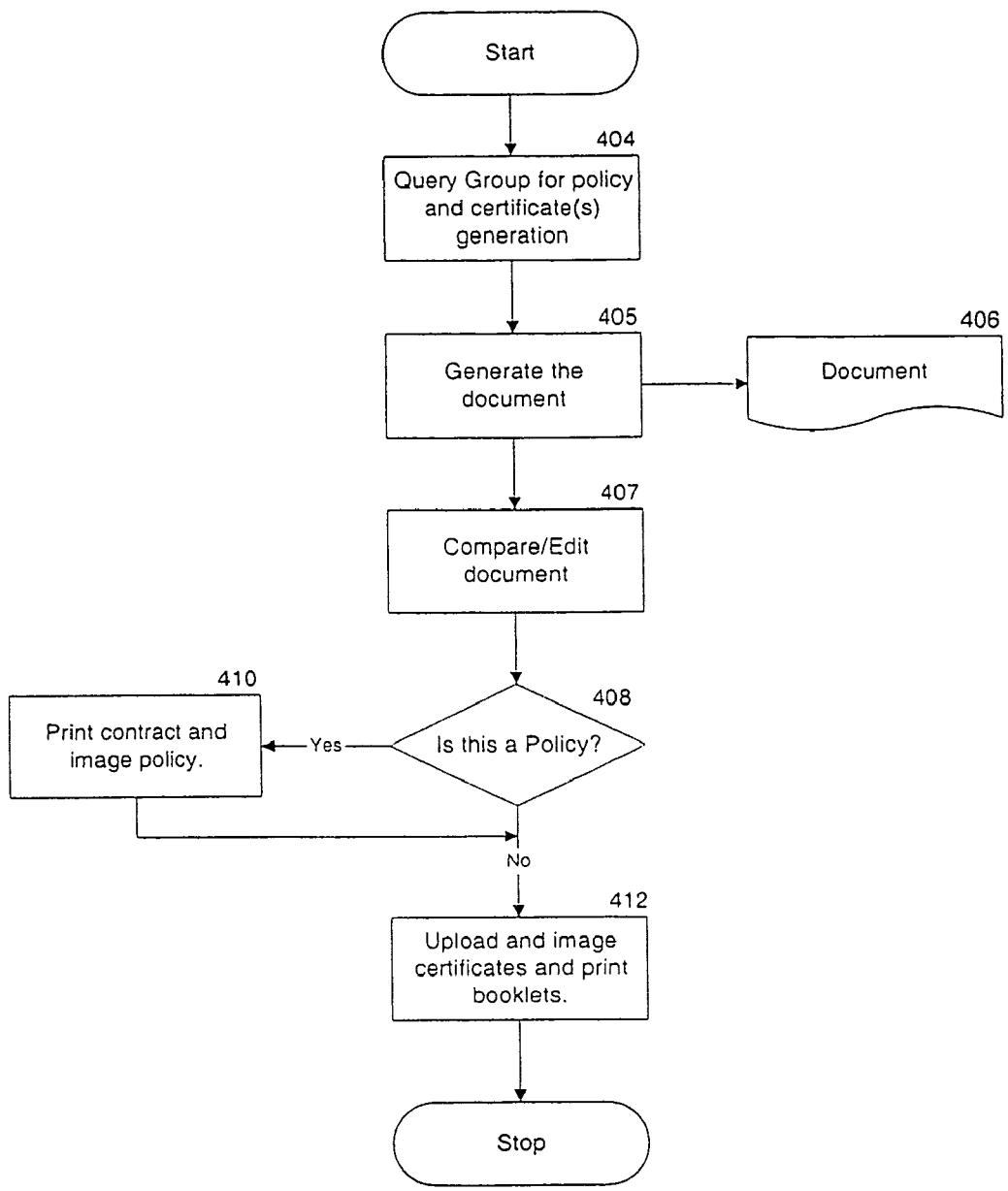
FIG. 10 is a flowchart of the document generation process within the Document Generator module.

FIG. 10 is a flowchart of the document generation process 402. The caseworker 22 requests the policy and certificate generation in step 404. Based on the caseworker's requests, the process 402 generates the appropriate document in step 405 and, optionally, prints the document in step 406. In step 407, the process 402 allows the user to compare the newly generated document with an old document, as in the case of renewal coverage, and allows the user to change the generated document as required. If the generated document is a policy, as determined in step 408, step 410 of the process 402 generates a letter and the contract along with an image of the policy. If the generated document is determined to be a certificate in step 408, the process 402 uploads the certificate to the imaging system and generates the appropriate booklets in step 412. The generated document or documents are transmitted to the client 14 and/or sales representative 16.

Figure 11:
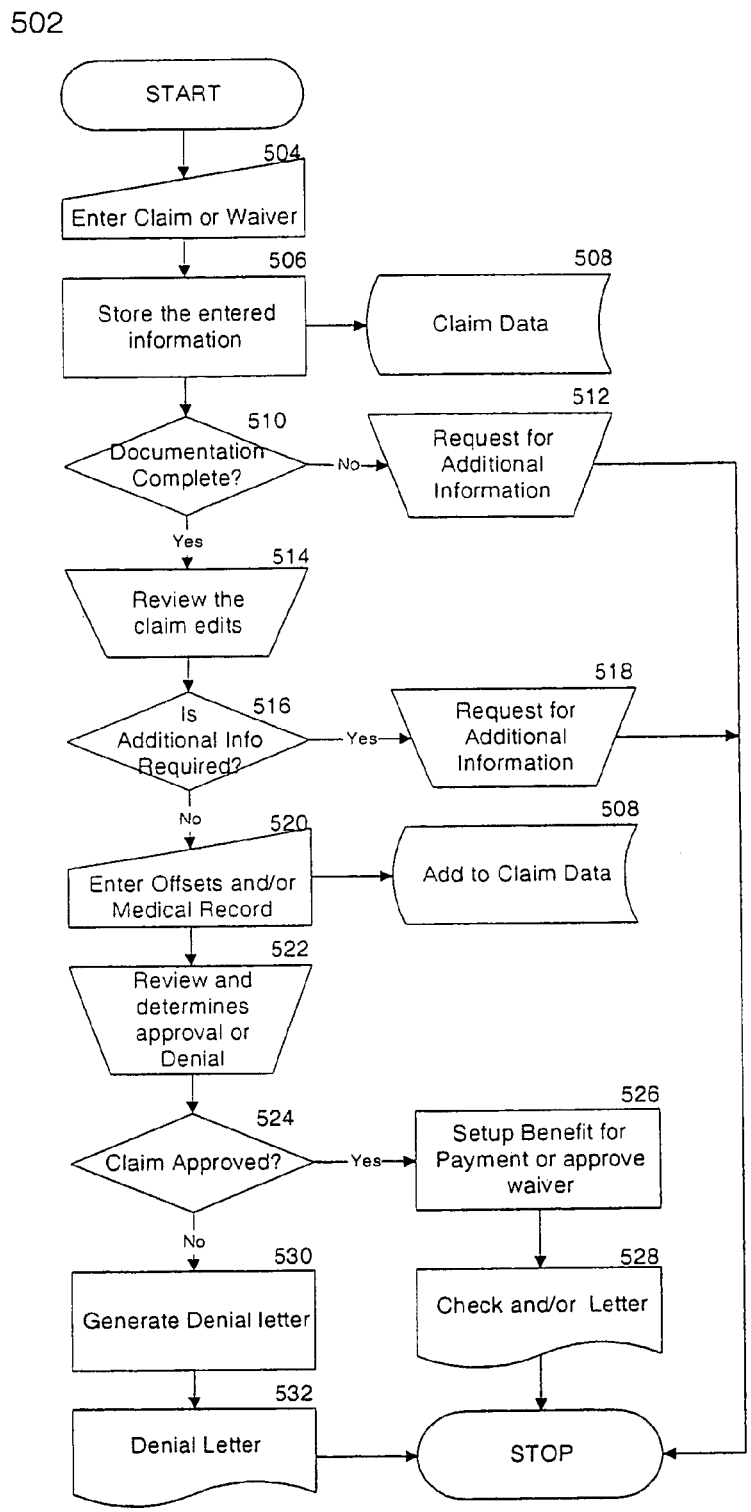
FIG. 11 is a flowchart of the claims process within the Claims module.

FIG. 11 is a flowchart of the claim module process 502 employed in the Claim module 500. The claim module process may provide claim processing for various products through different claim sub-modules. Each claim sub-module would apply the claim module process 502.

Once a claim is received it is electronically imaged in step 504 and the data is stored in step 506 to a claim database 508. Upon receipt of the claim, verification is made that all required documentation is attached in step 510. If any documentation is missing, a request is sent to the appropriate party in step 512 requesting the missing information. The claim is then reviewed in step 514 and verification is then made that all required information is included in the documentation in step 516. If any information is missing, a request is sent to the appropriate party in step 518 requesting the missing information. Additional information that is relevant to the claim, but that is not submitted with the claim may be entered in step 520 and stored in the claim database 508. The claim is then analyzed to determine whether the claim will be approved or denied in step 522. If the claim is determined to be approved in step 524, payment or a waiver is generated in step 526 and the appropriate documents, including checks 24, are transmitted in step 528. If the claim is determined to be denied in step 524, a denial letter is generated in step 530 and transmitted in step 532.

Figure 12:
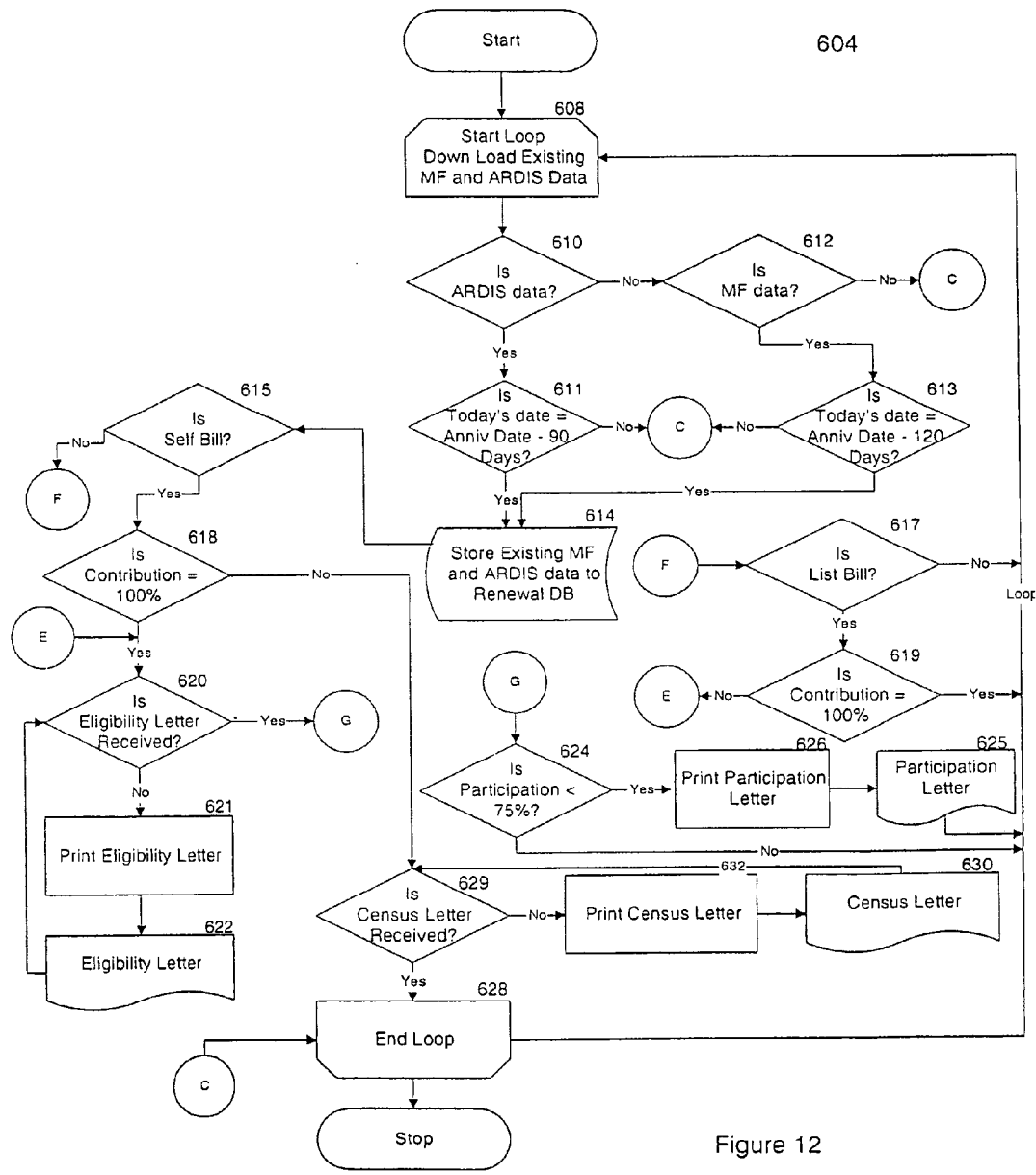
FIG. 12 is a flowchart of the renewal download process within the Renewal module.
Figure 13A:
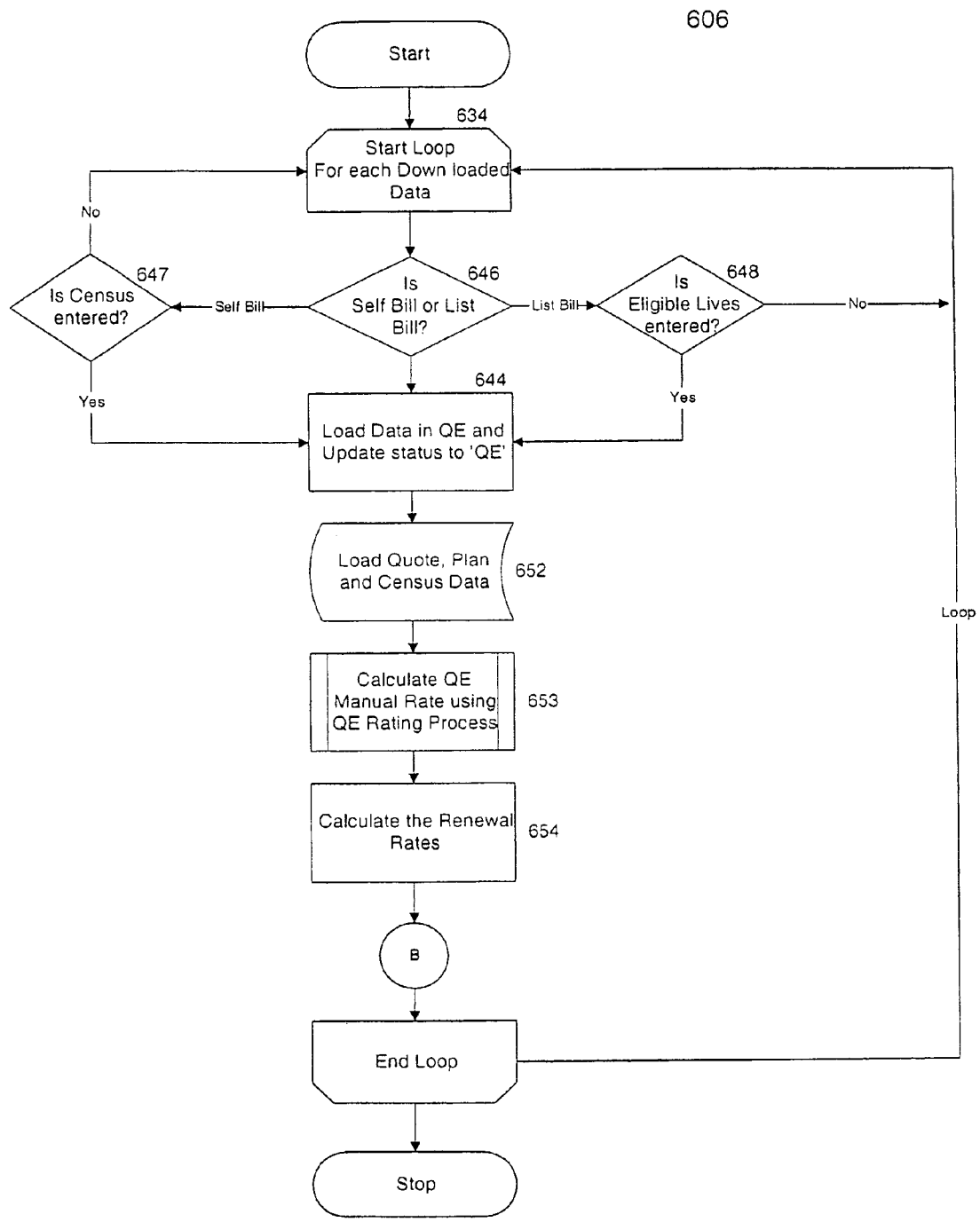
FIGS. 13A and 13B are a flowchart of the renewal process within the Renewal module.
Figure 13B:
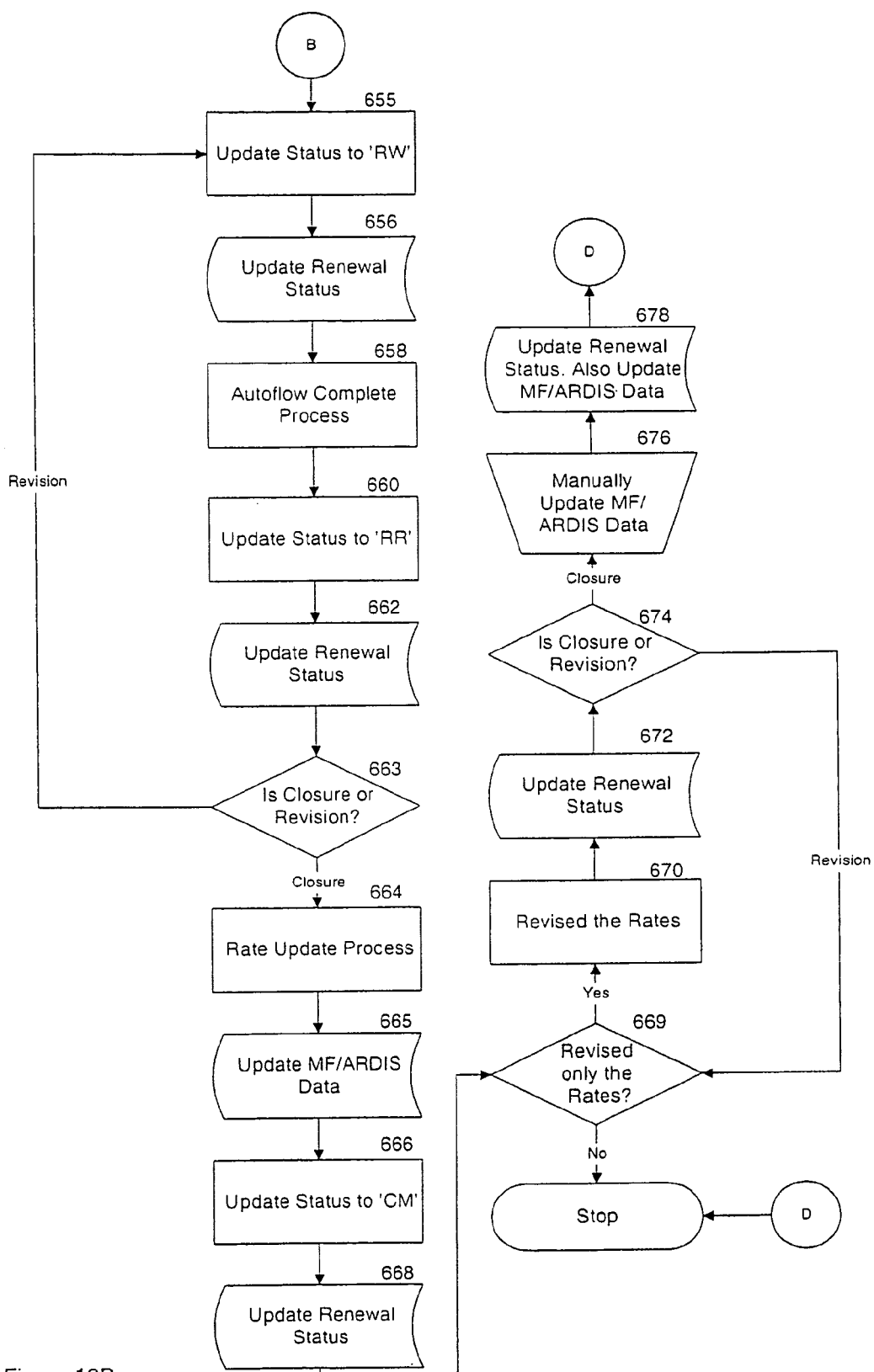

FIGS. 12, 13A and 13B are flowcharts of the processes employed in the Renewal module 600. The Renewal module utilizes two major processes: the renewal download process 604 shown in FIG. 12 and the actual renewal process 606 shown in FIGS. 13A and 13B.

The renewal download process 604 is shown in FIG. 12. In step 608, the renewal download process 604 downloads existing data either from the ARDIS module general database 310 or from the legacy mainframe system, depending on the age of the group. If the data is downloaded from the ARDIS database, as determined in step 610, the process 604 retrieves groups whose anniversary date is 90 days before the renewal date, as determined in step 611. If the data is downloaded from the mainframe system, as determined in step 612, the process 604 retrieves groups whose anniversary date is 120 days before the renewal date, as determined in step 613. Once the data has been downloaded and validated, the process 604 stores the updated data in the renewal database in step 614. After storing the data in the database, the process checks whether the client 14 is a self billed group in step 615, or a list bill group in step 617. If it is a self billed group, the process 604 determines the contribution of the client 14. If the contribution is 100% as determined in step 618, then it checks whether the eligibility letter 622 has already been received in step 620. If the eligibility letter 622 has not been received, then it generates the eligibility letter 622 in step 621. If the eligibility letter 622 has already been received, then it checks for the participation. If the contribution is less than 75% as determined in step 624, the process 604 then generates the participation letter 625 in step 626. If the participation is not greater than 75%, the loop ends in step 628. If the contribution is less than 100% as determined in step 618, then the process 604 checks whether the census letter 630 has been received in step 629. If not, then it generates the census letter 630 in step 632 and the loop ends in step 628.

If the group is list billed as determined in step 617, then the process 604 checks for the contribution. If the contribution is not 100% as determined in step 619, then it checks whether an eligibility letter 622 has been received in step 620. If not, then it generates an eligibility letter 622 in step 621; otherwise, it checks whether the participation is less than 75% in step 621. If the participation is less than 75%, then the process 604 generates the participation letter 625 in step 626 and the loop ends at step 628.

The renewal process 606 is shown in FIGS. 13A and 13B. During the renewal process 606 all the data is downloaded, verified and the renewal rates are calculated. After downloading the data in step 634, the process 606 identifies the renewal status for each downloaded renewal. The renewal process 606 also allows the underwriting department 30 to change the renewal rate after the closure in step 669. If the underwriting department 30 elects to revise the rates, the revised rates are entered in step 670 and the updated renewal status is stored in step 672. The underwriting department 30 can then either close the transaction or revise the rates in step 674, but in that case, the user must update the renewal rate into the corresponding ARDIS module general database 310 or in the mainframe system manually in step 676 and store the changes in the database 310.

As can be seen from the foregoing, throughout the method 10, no information must be entered into the method 10 more than once, and the information may be built upon throughout the method 10. Furthermore, no entered information need be made available to insurance company personnel other than as needed, preserving the security of the information.

Figure 14:
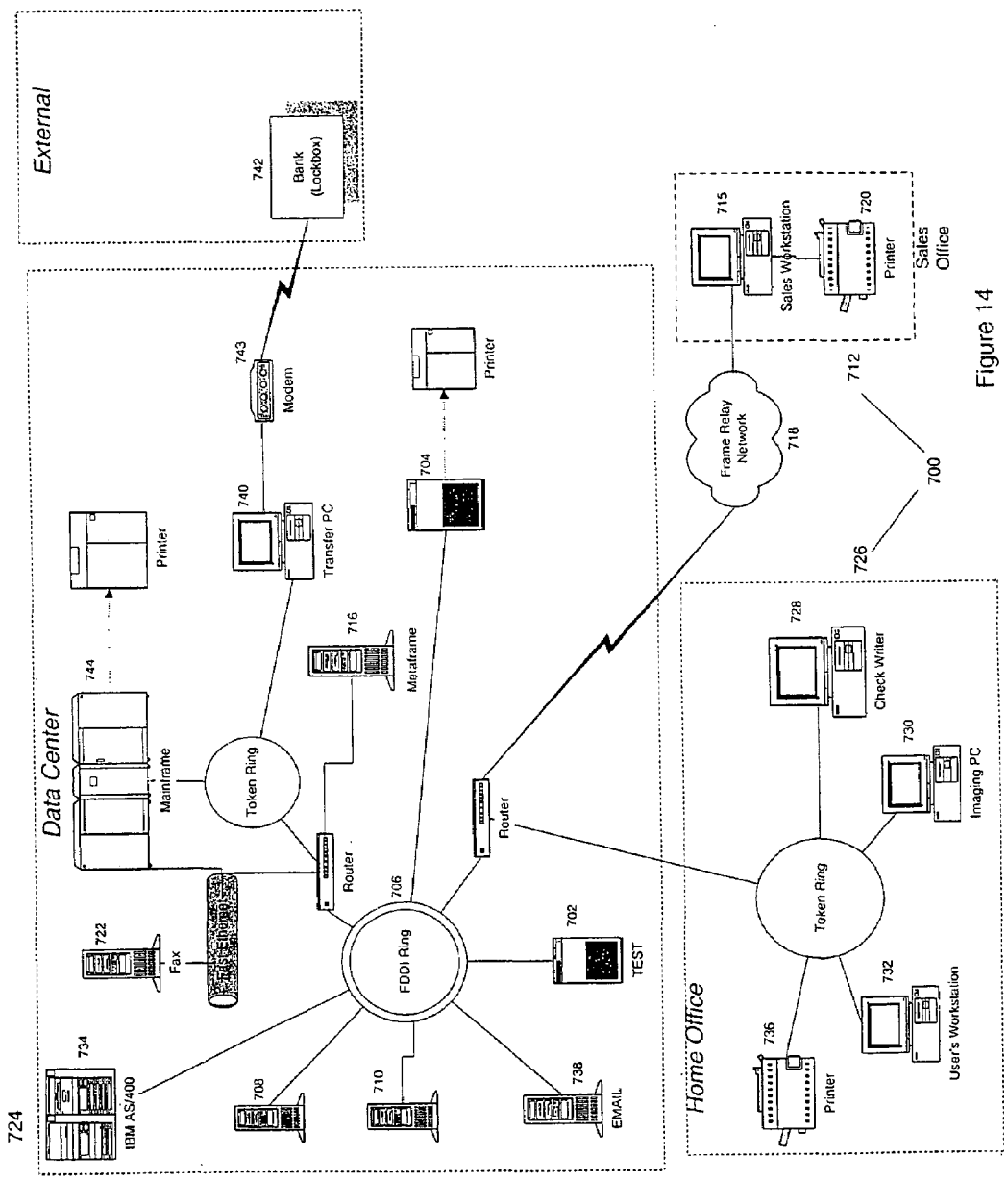
FIG. 14 is a schematic of the hardware constituting the apparatus of the invention and employed in the method of the invention.

FIG. 14 shows a preferred configuration of apparatus 700 for quoting, issuing, and administering insurance coverage for a group. Other configurations are contemplated and the following described configuration is not intended to be limiting, but only exemplary.

Two servers 702 and 704 house the test and production databases, respectively, and are connected through a Fiber Distributed Data Interface ("FDDI") ring 706. The production database server 704 contains the group client information and is used for production processing. A program development staff primarily uses the test database server 702 to modify existing programs and develop new programs. A similar server configuration exists for the local area network based file servers 708 and 710 which support test and production functions, respectively. This configuration allows the development staff to perform functional testing and the quality assurance and customer acceptance personnel to test developed software to ensure new programs satisfy the standards, quality and functionality before being employed on the production servers.

The sales office 712 has at least one workstation 714 connected to the production database 704 through a series of metaframe servers 716 using a frame relay network 718. Each sales office workstation 714 is connected to a local printer 720 for the production of proposals 18 and other necessary documents. A facsimile server 722 is used to send generated documents to the client 14 as well as to receive information from the client 14.

As shown in FIG. 14, the data center 724 has much of the hardware used in the method 10, and other hardware is located at a home office location 726. The home office 726 and data center 724 may be in a single or several locations. Hardware within the home office 726 includes a workstation 728 that is used to print commission checks; an imaging server 730 that is used to create images of generated legal documents; and a users workstation 732 that is used to enter client information, renewal information, and other data not gathered at the sales office 712. The images of the generated legal documents produced by the imaging server 730 are uploaded to the image database, which is stored on the image database computer 734, shown as an I.B.M. AS-400. As with the sales office 712, the workstations within the home office 726 are connected to a local laser printer 736.

In addition to the above hardware, additional servers are employed to facilitate the transfer and storage of information. An e-mail server 738, shown as a NOTES/e-mail server, is used to exchange internal e-mail messages between workstations. A transfer server 740 is used to receive premium data from the lock box 742 via modem 743, which is then uploaded to the database 704. Optionally, the hardware may be connected to an existing mainframe 744 for the provision of historical information. Ideally, such a connection will be temporary and the mainframe 744 will be phased out of the apparatus 700 configuration.

Thus it can be seen that the invention accomplishes at least all of its stated objectives.

We claim:

1. A computerized method of quoting, issuing and administering group insurance coverage for a client, comprising:

A. receiving and storing in a master computer database initial information regarding the client, the initial information relating to at least some of the following input parameters: employer: industry; effective date; estimated covered lives; actuarial data; prior carrier; and desired coverage;

B. using at least some of said initial information, and in a computerized quotation module:
  (i) processing the initial information to generate a proposal, wherein generating the proposal includes calculating at least some of the following output parameters: premium rate: plan information; actual effective date; billing period; and coverage information;
  (ii) storing the initial information and the output parameters in said master computer database; and C. upon receiving approval of the proposal generating insurance policies based at least in part upon the initial information and the output parameters stored in said master computer database; and D. using information stored in said master computer database, administering the insurance policies by:
  (i) automatically loading information stored in said master computer database into a computerized renewal database, comprising:
    a. determining which of said policies in said master computer database feature an anniversary dote that falls within a predetermined number of days from the date of said loading;
    b. storing information relating to said policies in said master computer database featuring said anniversary date to the computerized renewal database;
    c. determining which of said policies whose information is stored in said computerized renewal database are self bill policies and which of said policies are list bill policies, and for said self bill policies:
      1) determining whether contribution meets a predetermined contribution level, and responsive to the determining that the contribution does not meet the predetermined contribution level, checking to ensure that a census letter has been received, and responsive to the checking that the census letter has not been received, sending the census letter;
      2) responsive to the determining that the contribution meets the predetermined contribution level, checking to ensure that an eligibility letter has been received, and responsive to the checking that the eligibility letter has not been received, sending the eligibility letter;
      3) responsive to the checking that the eligibility letter has been received, determining whether participation meets a predetermined participation level, and responsive to the determining that the participation does not meet the predetermined participation level, printing a participation letter;
    d. for said policies whose information is stored in said computerized renewal database which are said list bill policies:
      1) determining whether contribution meets a predetermined contribution level, and responsive to the determining that the contribution does not meet the predetermined contribution level:
        x) checking to ensure that on eligibility letter has been received, and responsive to the checking that the eligibility letter has not been received, sending the eligibility letter; and
        y) responsive to the checking that the eligibility letter has been received, determining whether participation meets a predetermined participation level, and responsive to the determining that the participation does not meet the predetermined participation level, printing a participation letter;
  (ii) supplying renewal rates for at least some of said policies whose information is stored in said computerized renewal database;
  (iii) revising renewal status information for at least some of said policies whose information is stored in said computerized renewal database;
  (iv) updating renewal status information for at least some of said policies whose information is stored in said computerized renewal database; and
  (v) updating said master computer database with information from said computerized renewal database, relating to at least some of said list bill policies whose information is stored in said computerized renewal database and at least some of said self bill policies whose information is stored in said computerized renewal database.

2. The computerized method of claim 1, wherein receiving approval of the proposal comprises receiving approval of the proposal from the client.

3. The computerized method of claim 1, wherein receiving approval of the proposal comprises receiving approval of the proposal from the insurance company.

4. The computerized method of claim 1, wherein updating the renewal status information further comprises generating a notification to notify the client of the renewal rate, and receiving acceptance of the renewal rote.

5. The computerized method of claim 1, wherein administering the insurance policies further comprises:
supplying at least some of the initial information and the output parameters stored in said master computer database to a computerized billing module, and further:
calculating a billing dote based at least in part on at least some of the initial information and the output parameters stored in said master computer database;
generating a bill request based at least in part upon the billing dote;

searching a billing table to determine whether a previous bill having the some billing data has been issued;

responsive to the determining that no previous bill having the some billing data has been issued, generating a new bill based at least in part on at least some of the initial information and the output parameters from the client record; and creating a billing record in the billing table, the billing record based at least in part upon the new bill.

6. The computerized method of claim 5, wherein if a previous bill having the same billing data has been issued, then generating a duplicate of the previous bill.

7. The computerized method of claim 5, further comprising supplying information stored in said master computer database to a computerized premiums module, and further;

electronically receiving premium data that indicates that a premium associated with a billing record has been received; and updating a premium status in the billing record to indicate that the premium has been received.

8. The computerized method of claim 7, further comprising validating the premium data using the computerized premiums module.

9. The computerized method of claim 7, further comprising supplying information stored in said master computer database to a computerized commissions module that is programmed to calculate commissions based at least in part upon the premium status, and performing said calculation using said computerized commissions module.

10. The computerized method of claim 1, further comprising:

supplying information stored in said master computer database to a computerized document generation module that is programmed to automatically generate necessary documentation relating to said insurance coverage; and with the computerized document generation module, producing documents relating to said insurance coverage.

11. The computerized method of claim 1, wherein supplying a renewal rote comprises calculating the renewal rote.

12. The computerized method of claim 11, wherein calculating the renewal rate comprises calculating the renewal rote based on revised underwriting data.

13. A computerized method of quoting, issuing, and administering group insurance coverage for a client, comprising:

A. receiving and storing in a master computer database initial information regarding the client, the initial information relating to at least some of the following input parameters: employer: industry; effective date; estimated covered lives: actuarial data: prior carrier; and desired coverage:

B. using at least some of the initial information in a computerized quotation module:

(i) processing the initial information to generate a proposal, wherein generating the proposal includes calculating at least some of the following output parameters: premium rote; plan information; actual effective date; billing period; and coverage information;

(ii) storing the initial information and the output parameters in said master computer database; and C. upon receiving approval of the proposal, generating insurance policies based at least in part upon the initial information and the output parameters stored in said master computer database;

D. administering the insurance policies, including tracking billing and premiums payment status, further including supplying information stored in the master computer database to a plurality of computerized modules that are programmed to automatically generate and store information in said master computer database in order to administer the insurance policies without duplicative entry of information that has been previously stored in said master computer database:

E. using information stored in said master computer database, renewing at least some of the policies by:

(i) automatically loading information stored in said master computer database into a computerized renewal database, comprising:

a. determining which of said policies in said master computer database feature an anniversary date that falls within a predetermined number of days from the date of said loading;

b. storing information relating to said policies in said master computer database featuring said anniversary dote to the computerized renewal database:

c. determining which of said policies whose information is stored in said computerized renewal database are self bill policies and which of said policies are list bill policies, and for said self bill policies:

1) determining whether contribution meets a predetermined contribution level, and responsive to the determining that the contribution does not meet the predetermined contribution level, checking to ensure that a census letter has been received, and responsive to the checking that the census letter has not been received, sending the census letter;

2) responsive to the determining that the contribution meets the predetermined contribution level, checking to ensure that an eligibility letter has been received, and responsive to the checking that the eligibility letter has not been received, sending the eligibility letter;

3) responsive to the checking that the eligibility letter has been received, determining whether participation meets a predetermined participation level, and responsive to the determining that the participation does not meet the predetermined participation level, printing the participation letter;

d. for said policies whose information is stored in said computerized renewal database which are said list bill policies:

1) determining whether contribution meets a predetermined contribution level, and responsive to the determining that the contribution does not meet the predetermined contribution level:

x) checking to ensure that an eligibility letter has been received, and responsive to the checking that the eligibility letter has not been received, sending an eligibility letter; and y) responsive to the checking that the eligibility letter has been received, determining whether participation meets a predetermined participation level, and responsive to the determining that the participation does not meet the predetermined participation level, printing a participation letter;

(ii) supplying renewal rates for at least some of said policies whose information is stored in said computerized renewal database;

(iii) revising renewal status information for at least some of said policies whose information is stored in said computerized renewal database;

(iv) updating renewal status information for at least some of said policies whose information is stored in said computerized renewal database; and (v) updating said master computer database with information from said computerized renewal database, relating to at least some of said list bill policies whose information is stored in said computerized renewal database and at least some of said self bill policies whose information is stored in said computerized renewal database.

14. The computerized method of claim 13, wherein supplying information regarding the insurance coverage to a plurality of computerized modules comprises supplying information regarding the insurance coverage to at least some of the following computerized modules: a computerized billing module for generating and tracking bills; a premiums module for tracking premiums due and premiums received; a computerized commissions module; and a computerized document generation module.

15. A data processing system for quoting, issuing, and administering group insurance coverage for a client, comprising:

A. at least one user interface for receiving initial information relating to at least some of the following input parameters: employer; industry; effective date; estimated covered lives; actuarial data; prior carrier; and desired coverage;

B. a master computer database adapted to store said initial information and other information relating to said coverage through at least part of the term of such coverage;

C. a quotations module that is programmed to:
  (i) process at least some of the initial information to generate a proposal for consideration by said client, wherein generating the proposal includes calculating of least some of the following output parameters: premium rate; plan information; actual effective date; billing period; and coverage information;
  (ii) store the initial information and the output parameters in said master computer dot base; and D. a computerized soldcase module that is programmed to, upon receiving approval of the proposal, generate insurance policies based at least in part upon the initial information and the output parameters stored in said master computer database; and E. a renewal module that is adopted to renew at least same policies whose information is stored in said master computer database, by:
  (i) automatically loading information stored in said master computer database into a renewal database, comprising:
    a. determining which policies in said master computer database feature on anniversary date that fails within a predetermined number of days from the date of said loading:
    b. storing information relating to said policies in said master computer database featuring said anniversary date to a renewal database;
    c. determining which of said policies whose information is stored in said renewal database are self bill policies and which of said policies ore list bill policies, and for said self bill policies:
      1) determining whether contribution meets a predetermined contribution level, and responsive to the determining that the contribution does not meet the predetermined contribution level, checking to ensure that a census letter has been received, and responsive to the checking that the census letter has not been received, sending the census letter;
      2) responsive to the determining that the contribution meets the predetermined contribution level, checking to ensure that an eligibility letter has been received, and responsive to the checking that the eligibility letter has not been received, sending the eligibility letter;
      3) responsive to the checking that the eligibility letter has been received, determining whether participation meets a predetermined participation level, and responsive to the determining that the participation does not meet the predetermined participation level, printing a participation letter;
    d. for said policies whose information is stored in said renewal database which are said list bill policies;
      1) determining whether contribution meets a predetermined contribution level, and responsive to the determining that the contribution does not meet the predetermined contribution level;
        x) checking to ensure that an eligibility letter has been received, and responsive to the checking that the eligibility letter has not been received, sending the eligibility letter; and
        y) responsive to the checking that the eligibility letter has been received, determining whether participation meets a predetermined participation level, and responsive to the checking that the eligibility letter has not been received, printing the participation letter;
  (ii) supplying renewal rates for at least some of said policies whose information is stored in said renewal database;
  (iii) revising renewal status information for at least some of said policies whose information is stored in said renewal database;
  (iv) updating renewal status information for at least some of said policies whose information is stored in said renewal database; and
  (v) updating said master computer database with information from said renewal database, relating to at least some of said list bill policies whose information is stored in said renewal database and at least some of said self bill policies whose information is stored in said renewal database.

16. The data processing system of claim 15, further comprising presentation functionality for reporting output information corresponding to the information regarding the insurance coverage.

17. The data processing system of claim 15, further comprising a billing module for generating and tracking bills; a premiums module for tracking premiums due and premiums received; a commissions module; and a document generation module, all of which use at least some of said information in said master computer database.

18. The data processing system of claim 17, wherein the billing module is programmed to:

calculate a billing date based on initial information and output parameters stored in said master computer database;

generate a bill request based at least in part upon the billing date;

search a billing table to determine whether a previous bill having the some billing data has been issued;

responsive to the determining that no previous bill having the some billing data has been issued, generating a new bill based at least in port on at least some of the initial information and the output parameters from said master computer database; and create a billing record in the billing table, the billing record based of least in part upon the new bill.

19. The data processing system of claim 17, wherein the premiums module is programmed to:

electronically receive premium data that indicates that a premium associated with a billing record has been received; and update a premium status in the billing record to indicate that the premium has been received.

20. The data processing system of claim 17, wherein the commissions module is programmed to calculate commissions based at least in part upon premium status.

21. The data processing system of claim 17, wherein the document generation module is programmed to automatically generate necessary documentation relating to said insurance coverage, and with the document generation module, to produce documents relating to said insurance coverage.

* * * * *